(12) United States Patent
Rowe

(10) Patent No.: US 8,452,687 B2
(45) Date of Patent: May 28, 2013

(54) METHOD AND APPARATUS FOR FACILITATING AND MONITORING MONETARY TRANSACTIONS AND REWARDS IN A GAMING ENVIRONMENT

(75) Inventor: Rick Rowe, Henderson, NV (US)

(73) Assignee: IGT, Reno, NV (US)

( * ) Notice: Subject to any disclaimer, the term of this patent is extended or adjusted under 35 U.S.C. 154(b) by 1694 days.

(21) Appl. No.: 10/210,174

(22) Filed: Jul. 31, 2002

(65) Prior Publication Data

US 2003/0004871 A1    Jan. 2, 2003

Related U.S. Application Data

(63) Continuation-in-part of application No. 09/966,706, filed on Sep. 27, 2001, which is a continuation-in-part of application No. 09/921,716, filed on Aug. 3, 2001, now abandoned, which is a continuation-in-part of application No. 09/497,788, filed on Feb. 3, 2000, now abandoned.

(51) Int. Cl.
*G06Q 40/00* (2012.01)
(52) U.S. Cl.
USPC ............................................. 705/37; 705/35
(58) Field of Classification Search
USPC ............................................. 705/39, 35, 37
See application file for complete search history.

(56) References Cited

U.S. PATENT DOCUMENTS

| 4,023,013 A | 5/1977 | Kinker |
| 4,091,448 A | 5/1978 | Clausing |
| 4,114,027 A | 9/1978 | Slater et al. |
| 5,265,874 A | 11/1993 | Dickinson et al. |
| 5,371,345 A | 12/1994 | LeStrange et al. |
| 5,407,200 A * | 4/1995 | Zalabak ........................ 273/139 |
| 5,422,468 A | 6/1995 | Abecassis |

(Continued)

FOREIGN PATENT DOCUMENTS

| EP | 0 805 424 | 11/1997 |
| WO | 96/09100 | 3/1996 |

(Continued)

OTHER PUBLICATIONS

Notice of Allowance from U.S. Appl. No. 10/652,155, dated Jan. 29, 2008.

(Continued)

*Primary Examiner* — Muriel Tinkler
(74) *Attorney, Agent, or Firm* — Foley & Lardner LLP

(57) ABSTRACT

Methods and apparatus for facilitating and monitoring player financial and player tracking/reward transactions, including the tracking of player losses, are disclosed. In one embodiment, a system includes at least one server and a plurality of gaming machines and/or a game generator for transmitting game information to a remote game play location. The server has a memory containing data files corresponding to players. The data files contain information such as credits or monies in an account which belong to the player and which may be used by the player to play games. The data files also contain player tracking information, such as points awarded to a player based upon their game play and/or information regarding player expenditures or deductions, such as amounts wagered by a player. In one embodiment, a player and a casino may manage the player's accounts, such as by placing criteria upon the account(s), tracking a player's gain or loss while playing games, awarding awards such as prizes and credits for free game play or redeemable awards.

7 Claims, 3 Drawing Sheets

U.S. PATENT DOCUMENTS

| | | | |
|---|---|---|---|
| 5,429,361 A | 7/1995 | Raven et al. | |
| 5,457,306 A | 10/1995 | Lucero | |
| 5,462,286 A * | 10/1995 | Roberts | 273/459 |
| 5,470,079 A | 11/1995 | LeStrange et al. | |
| 5,555,497 A * | 9/1996 | Helbling | 705/14.1 |
| 5,621,640 A * | 4/1997 | Burke | 705/14.17 |
| 5,621,797 A | 4/1997 | Rosen | |
| 5,674,128 A | 10/1997 | Holch et al. | |
| 5,761,647 A | 6/1998 | Boushy | |
| 5,762,552 A | 6/1998 | Vuong et al. | |
| 5,811,772 A | 9/1998 | Lucero | |
| 5,816,918 A | 10/1998 | Kelly et al. | |
| 5,833,540 A | 11/1998 | Miodunski et al. | |
| 5,878,139 A | 3/1999 | Rosen | |
| 5,902,983 A * | 5/1999 | Crevelt et al. | 235/380 |
| 5,903,881 A | 5/1999 | Schrader et al. | |
| 5,910,048 A | 6/1999 | Feinberg | |
| 5,920,848 A | 7/1999 | Schutzer et al. | |
| 5,930,764 A | 7/1999 | Melchione et al. | |
| 5,952,640 A | 9/1999 | Lucero | |
| 5,953,710 A | 9/1999 | Fleming | |
| 5,959,277 A | 9/1999 | Lucero | |
| 5,999,919 A | 12/1999 | Jarecki et al. | |
| 6,001,016 A | 12/1999 | Walker et al. | |
| 6,003,013 A | 12/1999 | Boushy et al. | |
| 6,009,412 A | 12/1999 | Storey | |
| 6,012,983 A * | 1/2000 | Walker et al. | 463/20 |
| 6,012,984 A | 1/2000 | Roseman | |
| 6,015,344 A | 1/2000 | Kelly et al. | |
| 6,021,943 A | 2/2000 | Chastain | |
| 6,064,602 A | 5/2000 | Liu | |
| 6,064,990 A | 5/2000 | Goldsmith | |
| 6,110,041 A | 8/2000 | Walker et al. | |
| 6,158,657 A | 12/2000 | Hall, III et al. | |
| 6,175,921 B1 | 1/2001 | Rosen | |
| 6,182,131 B1 | 1/2001 | Dean et al. | |
| 6,183,362 B1 | 2/2001 | Boushy | |
| 6,185,545 B1 | 2/2001 | Resnick et al. | |
| 6,206,782 B1 | 3/2001 | Walker et al. | |
| 6,227,972 B1 | 5/2001 | Walker et al. | |
| 6,244,957 B1 | 6/2001 | Walker et al. | |
| 6,244,958 B1 | 6/2001 | Acres | |
| 6,267,292 B1 | 7/2001 | Walker et al. | |
| 6,293,865 B1 | 9/2001 | Kelly et al. | |
| 6,336,095 B1 | 1/2002 | Rosen | |
| 6,409,602 B1 | 6/2002 | Wiltshire et al. | |
| 6,425,828 B2 | 7/2002 | Walker et al. | |
| 6,508,710 B1 | 1/2003 | Paravia et al. | |
| 6,511,377 B1 * | 1/2003 | Weiss | 463/25 |
| 6,629,890 B2 | 10/2003 | Johnson | |
| 6,631,358 B1 * | 10/2003 | Ogilvie | 705/39 |
| 6,663,488 B1 | 12/2003 | Adams | |
| 6,896,618 B2 | 5/2005 | Benoy et al. | |
| 6,922,954 B2 | 8/2005 | Bradley et al. | |
| 6,965,868 B1 * | 11/2005 | Bednarek | 705/7.14 |
| 7,107,245 B1 | 9/2006 | Kowalick | |
| 7,390,263 B1 | 6/2008 | Acres | |
| 7,461,022 B1 * | 12/2008 | Churchill et al. | 705/37 |
| 7,526,447 B2 | 4/2009 | Rowe | |
| 8,135,644 B2 | 3/2012 | Rowe | |
| 2001/0031663 A1 | 10/2001 | Johnson | |
| 2002/0002075 A1 | 1/2002 | Rowe | |
| 2002/0039921 A1 | 4/2002 | Rowe et al. | |
| 2002/0082076 A1 | 6/2002 | Roser et al. | |
| 2002/0145051 A1 | 10/2002 | Charrin | |
| 2002/0147047 A1 | 10/2002 | Letovsky et al. | |
| 2002/0151359 A1 | 10/2002 | Rowe et al. | |
| 2002/0151363 A1 | 10/2002 | Letovsky et al. | |
| 2002/0153656 A1 | 10/2002 | Maksymec | |
| 2003/0045354 A1 | 3/2003 | Giobbi | |
| 2004/0039695 A1 | 2/2004 | Rowe et al. | |
| 2005/0203835 A1 | 9/2005 | Nhaissi et al. | |
| 2009/0176561 A1 | 7/2009 | Rowe | |
| 2012/0190433 A1 * | 7/2012 | Rowe | 463/25 |

FOREIGN PATENT DOCUMENTS

| | | |
|---|---|---|
| WO | 97/44750 | 11/1997 |
| WO | 98/12648 | 3/1998 |
| WO | 01/48713 | 7/2001 |
| WO | WO03/014870 | 2/2003 |

OTHER PUBLICATIONS

Richard Mitchell, "Glitter Gulch places a bet on debit cards", Credit Card Management, vol. 8, Iss. 12, p. 18;3, Mar. 1996.

EPO oral proceedings mailed Feb. 6, 2008 in related European Application No. 02761215.9.

Office Action dated Jan. 24, 2008 from U.S. Appl. No. 09/966,706.

Office Action dated Aug. 3, 2007 from U.S. Appl. No. 10/652,155.

Lafore, Microsoft C Programming for the PC, 1989, The Waite Group, Inc., Second Edition, pp. (5 pages).

Schneier, Applied Cryptopraphy, 1996, John Wiley & Sons, Inc., Second Edition, p. 52.

Downes, Dictionary of Finance and Investment Terms, 1995, Barron's Educational Series, Inc., pp. 126-127.

Unknown, www.Harrahs.com, Dec. 6, 1998, Harrahs, p. 1-5.

Examination Report from corresponding Australian Patent Application 2002326495, Jul. 16, 2007 (2 pages).

Office Action dated Jun. 26, 2007 from European Application No. 02761215.9, which corresponds to U.S. Appl. No. 09/921,716 (4 pages).

Australian Examination Report mailed May 12, 2005 in Application No. 2003201013 [P122AU].

Decision to Refuse a European Patent Application dated Jan. 12, 2009 issued for EP 02761215.9 [P130X1EP].

EP Summons to attend Oral Proceedings pursuant to Rule 115(1) EPC, dated Feb. 6, 2008 in European Patent Application No. 02761215.9 P130X1EP].

International Search Report dated May 30, 2003 from PCT/US02/24426 [P130X1WO].

Written Opinion of the International Searching Authority dated Aug. 19, from PCT/US02/24426 [P130X1WO].

US Office Action dated Sep. 30, 2002 issued in U.S. Appl. No. 09/497,788 [P130].

US Office Action dated Nov. 8, 2002 issued in U.S. Appl. No. 09/921,716 [P130X1].

US Office Action Final dated Apr. 28, 2003 issued in U.S. Appl. No. 09/921,716 [P130X1].

Notice to Abandon with Interview Summary dated Nov. 18, 2003 issued in U.S. Appl. No. 09/921,716 [P130X1].

US Notice of Allowance dated Feb. 27, 2009 issued in U.S. Appl. No. 10/652,155 [P130X1C1].

US Notice of Allowance dated Feb. 3, 2009 issued in U.S. Appl. No. 10/652,155 [P130X1C1].

US Notice of Allowance and Examiner's Amendment dated Jan. 16, 2009 issued in U.S. Appl. No. 10/652,155 [P130X1C1].

Provision of the Minutes in Accordance with Rule 124(4) EPC dated Jan. 12, 2009 issued for EP 02761215.9 [P130X1EP].

Unpublished U.S. Appl. No. 09/497,788 filed Feb. 3, 2000 by Rowe et al, entitled "Method and Apparatus for Facilitating Monetary and Commercial Transactions".

US Office Action dated Mar. 26, 2002 issued in U.S. Appl. No. 09/497,788 [P130].

US Notice of Allowance and Examiner's Amendment dated Jun. 2, 2008 issued in U.S. Appl. No. 10/652,155 [P130X1C1].

U.S. Supplemental Notice of Allowance dated Mar. 5, 2008 from Patent U.S. Appl. No. 10/652,155.

U.S. Supplemental Notice of Allowance dated Mar. 17, 2008 from U.S. Appl. No. 10/652,155.

Unpublished U.S. Appl. No. 12/404,899 filed on Mar. 16, 2009 by Rowe, entitled "Method and Apparatus for Facilitating Monetary and Reward Transactions and Accounting in a Gaming Environment".

US Office Action dated Jan. 23, 2009 issued in U.S. Appl. No. 09/966,706 [P130X2].

US Office Action Final dated Jun. 24, 2008 issued in U.S. Appl. No. 09/966,706 [P130X2].

US Examiner Interview Summary May 19, 2008 issued in U.S. Appl. No. 09/966,706 [P130X2].

US Office Action Final dated Oct. 3, 2007 issued in U.S. Appl. No. 09/966,706 [P130X2].
US Examiner Interview Summary dated Feb. 27, 2007 issued in U.S. Appl. No. 09/966,706 [P130X2].
US Advisory Action dated Oct. 25, 2004 issued in U.S. Appl. No. 10/099,152 [P122].
US Examiner Interview Summary dated Jan. 18, 2006 issued in U.S. Appl. No. 10/099,152 [P122].
European Search Report dated Jun. 3, 2007 of European Patent Application No. 02 761 215.9 (3 pages).
International Preliminary Examination Report dated Oct. 23, 2003 from PCT Application No. PCT/US02/24426 (3 pages).
Internet Archive, Harrahs.com, Aug. 15, 2000, http://web.archive.org/web/20000815074354/www.harrahs.com/home/home.html, (10 pages).
Office Action dated Oct. 22, 2003 from U.S. Appl. No. 10/099,152 (13 pages).
Final Office Action dated May 14, 2004 from U.S. Appl. No. 10/099,152 (11 pages).
Office Action dated Jan. 7, 2005 from U.S. Appl. No. 10/099,152 (7 pages).
Final Office Action dated Dec. 21, 2005 from U.S. Appl. No. 10/099,152 (8 pages).
Office Action dated Nov. 16, 2006 from U.S. Appl. No. 10/099,152 (12 pages).
Office Action dated Dec. 20, 2006 from U.S. Appl. No. 10/652,155 (8 pages).
Office Action dated Jan. 17, 2007 from U.S. Appl. No. 09/966,706 (16 pages).
Office Action dated Jun. 4, 2007 from U.S. Appl. No. 09/966,706 (15 pages).
U.S. Final Office Action dated May 28, 2009 from U.S. Appl. 09/966,706.
US Office Action dated Sep. 16, 2009 issued in U.S. Appl. No. 09/966,706 [P130X2].
US Final Office Action dated Apr. 19, 2010 issued in U.S. Appl. No. 09/966,706 [P130X2].
US Office Action dated Jul. 13, 2011 issued in U.S. Appl. No. 12/404,899.
US Notice of Allowance dated Dec. 28, 2011 issued in U.S. Appl. No. 12/404,899.
US Office Action dated Jul. 31, 2012 issued in U.S. Appl. No. 13/356,979.
US Advisory Action dated Jun. 29, 2010 issued in U.S. Appl. No. 09/966,706.
US Final Office Action dated Aug. 11, 2010 issued in U.S. Appl. No. 09/966,706.
US Final Office Action dated Dec. 14, 2010 issued in U.S. Appl. No. 09/966,706.
US Office Action dated Mar. 1, 2012 issued in U.S. Appl. No. 09/966,706.
US Final Office Action dated Jun. 6, 2012 issued in U.S. Appl. No. 09/966,706.
Canadian Office Action dated Jul. 14, 2010 issued in CA 2,454,641.
Canadian Office Action dated Nov. 14, 2011 issued in CA 2,454,641.
European Search Report dated Mar. 6, 2007 issued in EP 02 761 215.9.

* cited by examiner

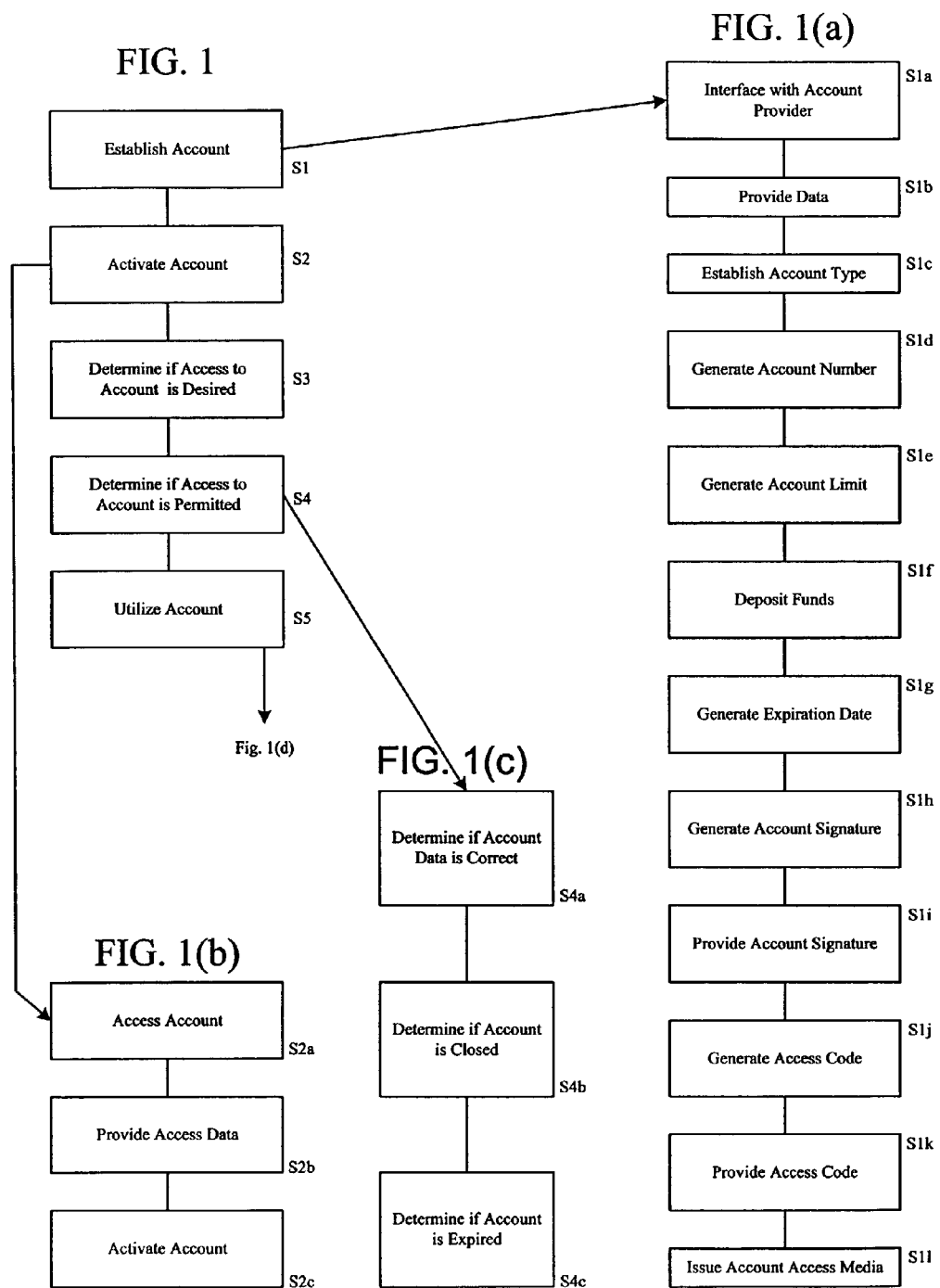

METHOD AND APPARATUS FOR FACILITATING AND MONITORING MONETARY TRANSACTIONS AND REWARDS IN A GAMING ENVIRONMENT

RELATED APPLICATIONS

This application is a continuation-in-part of U.S. application Ser. No. 09/966,706 filed Sep. 27, 2001, which is a continuation-in-part of U.S. application Ser. No. 09/921,716 filed Aug. 3, 2001 now abandoned, which is a continuation-in-part of U.S. application Ser. No. 09/497,788 filed Feb. 3, 2000 now abandoned.

FIELD OF THE INVENTION

The present invention relates to methods and devices for providing rewards and permitting monetary transactions, especially in association with game play, and methods of monitoring player financial transactions, including tracking amounts lost by a player.

BACKGROUND OF THE INVENTION

Traditionally, the play of casino games and other games of chance was based on the wagering of actual money, such as coins and currency. Coins and currency have traditionally been used directly as bets in table games such as poker and blackjack. Alternatively, the coins and currency are exchanged for chips which have a representative monetary value.

As mechanical games of chance were developed, such as the well-known slot machine, coins were used to activate the machines. Later, bill validators were provided which allowed players to avoid the need to convert their currency to coins before playing a gaming machine.

Outside of the gaming industry, the consumers were provided with a large variety of options to effectuate their banking and other monetary transaction needs. For example, the credit card was developed and has become widespread in use.

In some instances, the gaming industry has come to embrace some of this technology and provide greater flexibility to consumers. In general, however, the development of this technology has focused upon interfacing existing external systems, such as banking systems, with internal casino accounting. For example, U.S. Pat. No. 5,457,306 discloses the use of credit cards in association with gaming machines.

The prior art has not addressed, at least from the consumer or player's point of view, providing convenient means for effecting financial transactions in the gaming environment. In addition, players are not provided with a convenient mechanism for tracking their play, including expenditures and winnings.

In some jurisdictions, a casino or other entity providing gaming services is not permitted to allow a patron or player to continue game play if the patron or player has lost more than a given amount of money in a predetermined period of time. It is thus important for a casino to be able to track the wins and losses of a player to ensure compliance with these regulations.

Several problems frustrate the ability of a player and a casino to monitor or track player wins and losses. In most game play scenarios, a player places many bets and at one or more times is paid winnings. It becomes very difficult for the player to track the total amounts wagered and paid out for determining total loss (or win). A casino may attempt to track a player's play with a player tracking system where a gaming machine provides coin in and coin out data. In many instances, however, a player may not use the player tracking system. In addition, certain games which are played may not be associated with the system. A player not using the system may lose hundreds of dollars without the casino being aware of the loss, in violation of the regulations.

Casinos are continually looking for new ways to entice existing players to play games, and draw in new players. In some instances, casinos track player game play and, if the player's level of play reaches a certain level, may reward the player independent of the any winnings the player receives from game play. For example, the casino may offer the player a free night's stay at a hotel associated with the casino. This system offers little player interaction, however, with the discretion of awards left to the casino.

A system and method for monitoring player financial transactions, including tracking of player loss, is desired. It is desirable to provide one or more methods and devices which serve to facilitate monetary and commercial transactions in a manner overcoming the above-stated limitations. It is also desirable to provide an improved system for providing player rewards in a gaming environment.

SUMMARY OF THE INVENTION

The present invention comprises methods and apparatus for tracking, effectuating and/or monitoring financial and reward transactions in a casino or gaming environment. One embodiment of the invention comprises a method and system for monitoring player financial transactions for tracking player loss.

One embodiment of the invention comprises a financial monitoring system. The system includes one or more gaming machines or devices. The system also includes a financial system host. The financial system host includes a memory for storing data. Preferably, the data includes one or more files corresponding to a player. The one or more files are identifiable with a player identification.

Means are provided for generating financial data and associating that data with a player's file or files. Means are also provided for determining a player's loss. In one embodiment, this means comprises software for determining loss from amounts credited to and debited from the player's account.

In one embodiment, a plurality of player identification input devices are provided. The input devices may be associated with or be independent of the gaming devices. Each input device is linked to the financial host for receiving player identification information. The input device may comprise a card reader or similar element for reading identification information from a player card, such as a special player account or tracking card issued by a casino, or a player's credit or ATM card.

One or more embodiments of the invention comprise a method for monitoring player financial activities, including player losses. In one embodiment, a player's deposits and credits are tracked. In one embodiment, this tracking comprises monitoring a player's request for funds from outside financial institutions such as a bank. The monitoring may also comprise the tracking of a player's deposits to their account and the award of winnings from a gaming machine. In one embodiment, information regarding a player's deposits or credits are stored in a financial account or file.

In another embodiment, a player's withdrawals, such as bets or wagers placed by a player are monitored. This information is also stored, such as in the player's financial account. A player's losses (or winnings) are monitored using the player's deposit or credit information and player bet or other expenditure/withdrawal information.

In one embodiment of the invention, a casino or other game operator may monitor a particular player's activities for determining a player's losses. This information may be used to ensure compliance with jurisdictional regulations which prevent a casino from offering game play to a player who has lost more than a predetermined amount of money in a predetermined amount of time. In one embodiment, the system or linked systems may be used by multiple casinos, whether in one or more jurisdictions, for monitoring player play.

One or more embodiments of the invention comprises a system including a network linking a plurality of gaming machines and at least one transaction host or server. The gaming machines are arranged to accept input of player identification information. In one embodiment, the gaming machine includes a card reader for reading identification information from a magnetic stripe.

The transaction host includes a memory. At least one data file is stored at the memory in association with each player. The at least one data file is accessible with the identification information. The data file includes financial information. Preferably, the financial information comprises credit information. The credit information represents credits or monies which belongs to the player and/or may be used to play a gaming machine. In one or more embodiments, the player's file or files represent one or more financial or award accounts. In one or more embodiments, the data file includes playerplay or reward information. The reward information may include points which have been awarded to the player.

The system is configured to update credit information corresponding to a player in the player's file based on amounts bet and amounts won. The system is also configured to record or track game play information as a player plays a game.

In one embodiment, the system includes a gateway via which a player may access the transaction host and obtain financial and reward information, and engage in financial and reward transactions. A player may also engage in these activities through a kiosk, customer service station or the like associated directly with the network.

In one embodiment, the system includes a financial host and a reward host, each containing one or more files regarding a player. The financial and reward hosts are linked. Use by a player of their player card permits the player to access both their financial account (such as by betting credits associated with the account) and their reward account (such as by accumulating credits based upon the player's game play).

In accordance with a method, one or more accounts or files are associated with a player. One or more of the files or accounts are financial accounts having associated credit information.

A player may deposit funds which are credited to their file or account. The funds may be deposited electrically, such as by a wire transfer. The funds may also be deposited to a cashier and then credited by the casino. A player may engage in the play of a gaming machine and place bets using credits associated with their file or account. Winnings may be credited to the player's account.

In one or more embodiments of the invention, a player and/or the casino operator may place criteria or restrictions upon the account. For example, only a certain amount of money or credits may be deducted from the player's account over a predetermined period of time. In one embodiment, a player may have a main account comprising a debit account from which bets are deducted. The player may have a secondary account to which all winnings are credited.

A player may divert all or a portion of their winnings. For example, a portion of each win may be deposited in the player's account and a portion may be diverted to a charity account. The casino may also divert a portion of the player's winnings representing a tax withholding.

A player may access and manipulate their one or more accounts via an on-line communications link. The player may combine, close and open accounts. The player may deposit and deduct funds. The player may purchase reward points and redeem points for prizes or credits which are deposited in the player's funds account.

In accordance with the invention, a player establishes a financial account directly with a casino. The player and casino are permitted to manage the account. The player is also provided with a separate or integrated reward account.

In one embodiment, a system of the invention includes a game server. The game server is adapted to generate game information for transmission to a remote location where a game is presented using the generated information. The game transaction server is also adapted to receive input, such as a player's input regarding the play of a game.

In this embodiment, a player is permitted to play a game from a remote location, such as a remote station, home or office computer. A player's identification information is provided to the system, such as via the gaming gateway. A communication link is provided between the player's remote location and the gateway. This link may comprise the Internet or a dedicated line.

The player's identification information is utilized to verify funds available to the player for establishing entitlement to a play a game, i.e. the placing of a wager or bet. The player's play may be tracked and the player may manipulate their account(s) and having winnings from the play of the remote game credited to their accounts(s).

In one or more embodiments, one or more accounts are utilized for player rewards. In one embodiment, a casino associates prize or reward information with one or more player accounts. The reward information may comprise points, miles, phone minutes, actual designations of physical prizes or the like. In one embodiment, a player accrues rewards through game play, such as randomly awarded by a casino, by engaging in promotions or other forms of game play. In one embodiment, the player may redeem points, miles or the like for actual prizes. A player may be permitted to purchase points, miles or the like.

In one embodiment, a player may be provided with a reward account for rewards entitling the player to game play. A casino may associate credits which the player may use to play games, such as at gaming machines or casino table games. In one embodiment, the credits, points or the like may only be used at the casino and have no monetary value.

A player may view their rewards accounts and manage them, such as by combining accounts, starting new accounts or the like. A player may view reward account information and redeem awards.

Further objects, features, and advantages of the present invention over the prior art will become apparent from the detailed description of the drawings which follows, when considered with the attached figures.

DESCRIPTION OF THE DRAWINGS

FIG. 1 is a flow diagram illustrating a method in accordance with the present invention;

FIG. 1(a) is a flow diagram illustrating in detail a method comprising a step of establishing an account in accordance with the method illustrated in FIG. 1;

FIG. 1(b) is a flow diagram illustrating in detail a method comprising a step of activating an account in accordance with the method illustrated in FIG. 1;

FIG. 1(c) is a flow diagram illustrating in detail a method comprising a step of determining if access to an account is permitted in accordance with the method illustrated in FIG. 1;

DETAILED DESCRIPTION OF THE INVENTION

Figure 1D:
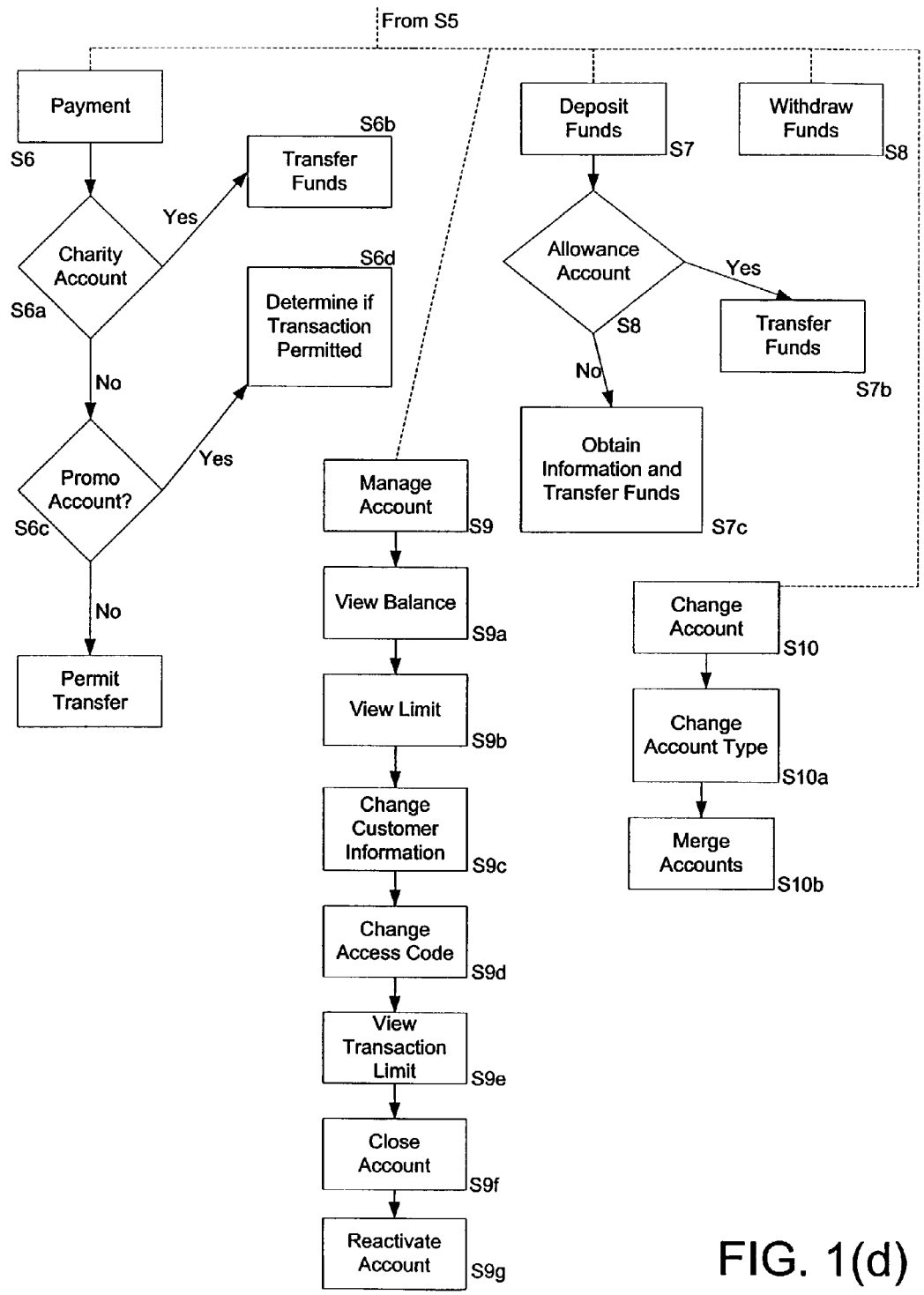
FIG. 1(d) illustrates various flow diagrams of methods comprising a variety of methods of utilizing an account in accordance with the method illustrated in FIG. 1.

The invention comprises various methods and apparatus for facilitating and monitoring monetary and commercial transactions in a gaming environment, including tracking of player financial transactions in a manner permitting player loss monitoring, and facilitating reward and financial transactions. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises one or more methods and apparatus for facilitating and monitoring transactions, such as monetary or other funds transfers and purchases, and especially those occurring at least partially electronically. In one or more embodiments, the invention comprises methods and apparatus for facilitating commercial transactions, such as the purchase of goods and services. In other embodiments, the invention comprises methods and apparatus for facilitating monetary and reward transactions in a gaming environment. The methods and apparatus are adapted to permit the tracking of financial transactions associated with a player in the gaming environment, such as for determining or monitoring player gaming losses. Additional aspects of the invention comprises methods and apparatus for facilitating the award of rewards to a player or players, such as based upon game play.

In one embodiment, at least one player account is generated for use in monitoring and facilitating the financial transactions. Financial information or data is associated with the account. This data includes, or can be used to generate, player loss information. The player loss information can be used by a player to self-regulate their activities, or by a casino, such as for enforcing play regulations.

Referring to FIG. 1, there is a flowchart illustrating generally a method of creating an account and utilizing an account in accordance with an embodiment of the invention. In a first step S1, an account is established. The account is established by an account provider. The account provider may be a retailer, bank or other entity, such as described in more detail below, a casino. As provided below, regardless of whether the account is referred to as a financial, bank, debit, monetary or other named account, the account has certain characteristics that define it. The account may be established at the request of a party for use by themselves or for use by another or others.

Referring to FIG. 1(a) there will be described one or more methods for establishing an account. In a first step S1a, a customer interfaces with an account provider. This step may comprise the customer accessing a website belonging to the account provider, calling an account provider customer representative, or accessing one or more other means now known or later developed by which the customer may provide information to the account provider. Also, the customer may travel to the location of the account provider or to a designated location provided by the account provider (such as a kiosk).

In a step S1b, the customer provides data to the account provider. This data is used to set up the account. The particular data which is required may vary by provider. In one or more embodiments, the data may include the customer's name and/or the name(s) of the parties which are to be permitted to access the account, address, telephone number, social security number, birth date, mother's maiden name and/or other information. In the event the customer is a business, the information may comprise the business name, address, telephone number, taxpayer identification number and/or similar information.

The particular manner by which this information is transmitted to the account provider may depend upon the interface the customer is using. For example, the data may be input into a graphical user interface associated with the account provider's website and then sent to the account provider's computer, such as over the Internet. The data may be provided orally over the phone by the customer to the account provider. The customer may also fill out a printed form and transmit the form, such as by mail or facsimile.

In a step S1c, an account type is established. In one or more embodiments, the account type may comprise one or more of the following: general customer, charity debit, promotional, or allowance account. The account may be utilized for a wide variety of purposes and need not be limited to those described below.

A general customer account is preferably of the type where funds belonging to the customer are assigned or credited to the account, and payments, outgoing transfers and the like are associated with direct debits of these funds from the customer's account. As described below, the customer account preferably permits deposits thereto as well. In one embodiment, the nature of the account as a debit account differs from a credit type account where those funds which are debited belong to the account provider or other creditor with the requirement that the customer repay the account provider with their funds at a date after a particular transaction. In general, the general customer account permits a customer to make and pay for purchases, obtain funds (such as currency), and transfer funds into and out of the account. As described in more detail below, in one embodiment, such transactions may comprise the debiting of funds from the account as payment for a wager or bet when playing a game, and may include the deposit of winnings.

A charity debit account is preferably of the type where the customer may only transfer funds from the account to an authorized charity or similar entity, with no other debits permitted (except return of the funds to the customer or transfer of funds to another account belonging to another account at the specific instruction of the customer). Generally, the customer will provide the account provider specific information about the charity to which funds are to be transferred. The customer may arrange the account such that funds are debited and transferred to the charity at one or more predetermined times and for one or more predetermined amounts.

A promotional account is preferably of the type where the customer is a promoter arranging an account for use by one or more other parties. For example, the promoter may be a store owner and the parties who may use the account may comprise customers or potential customers of the store. The promotional account is arranged so that the parties or users may access the account in accordance with the terms of a promotion offered by the promoter. A promoter may establish an account having funds permitting a number of parties to pay for a certain dollar amount of goods purchased at their store via the promotional account. For example, a promoter may establish a promotion for a number of parties, such as 1000 existing customers, whereby $10 of each purchase from the promoter over $20 is payed for by the promoter. The $10 payment may be debited from the promotional account at the time each party makes a qualifying purchase to credit the parties' payment of the goods or services. In one embodiment, the promotional account may comprise an account entitling a party to play a predetermined amount of money at games at a casino, or to obtain other goods or services from the casino operator.

An allowance account is preferably of the type where funds are arranged to be periodically transferred into the account. Such an account may be extremely useful to parents having children. In accordance with this account arrangement, funds are periodically transferred into the account for subsequent use. The funds may be transferred from another established account, or an account or other source not associated with the account provider. For example, parents may establish a customer account from which funds are periodically transferred, such as every two weeks, into an allowance account which is accessible by one or more of their children. These children may access the allowance account to pay for books and the like. In this manner, the parents may control (and as described below, track) the spending of their children or other parties which have access to the account.

An allowance account may also be used to pay bills and pay for entertainment or be for other purposes. Monies may be deposited in the account periodically for paying particular bills, especially those which are payable on a predetermined regular basis. The allowance account may be used to define an amount of money for a particular discretionary purpose. For example, a family may deposit monies into an allowance account which may be used in that or successive months for entertainment purposes, such as gaming, travel, movies, or the like.

Those of skill in the art will appreciate that the particular type(s) of accounts and their various features or characteristics may be different than those provided above. For example, an account may have one or more features associated with more than one of the account types provided above.

In a step S1$d$, the account provider generates an account number and associates the account number with the account. The account number may be used by the account provider and customer to identify the account.

In a step S1$e$, in one embodiment of the invention, the account provider assigns the account with a maximum funds value or value limit. In general, this value may be selected by the customer. Most often, the maximum value will comprise the amount of an initial deposit into the account by the customer. In one or more embodiments, the account provider may only offer accounts having pre-set limits, such as $50, $100, $250 or $500. In another embodiment of invention, the account has no limit.

In a step S1$f$ funds are deposited into the account. In an embodiment where the account has a minimum limit, the maximum amount of funds which may be deposited into the account does not exceed the funds maximum value associated with the account.

In one or more embodiments, the customer may provide data which permits the account provider to obtain funds electronically. In one or more embodiments, this comprises providing the account provider with a routing number for a checking or savings account at a bank, account and access information for an ATM card linked to an account, or a credit card. In one or more embodiments, a customer may be permitted to deposit funds by mail or similar non or partially non-electronic manner. A customer may also be permitted to deposit monies in person, such as at a cashier cage at a casino or a bank teller.

In a step S1$g$, the established account may be assigned an expiration date. In one or more embodiments of the invention, this step comprises associating date data with the account. The expiration date may be generated in a wide variety of manners. The expiration date may comprise a date which is determined by adding a fixed period of time to the date on which the account is established or, as described below, the date on which the account is activated. As described below, the account is arranged such that when the actual date reaches the expiration date, the account can not be accessed except by the account provider.

In a step S1$h$, an account signature is generated and associated with the account. The signature comprises a unique code or other element for identifying the account and/or establishing entitlement to access the account. In one or more embodiments, the account provider generates the code based on one or more elements of data associated with the account, such as customer provided data, the initial funds deposit amount, the account number, the account expiration date and/or one or more other elements. In one or more embodiments, the account signature is generated from, or includes, an access code or personal identification number (PIN) data assigned to or selected by the customer as described below. In one or more embodiments, the data used to generate the signature may be input into an encryptor to generate an output which comprises the account signature. The account signature may be generated randomly as well. Preferably, whatever means is used to generate the signature, each signature is unique for a particular account.

In a step S1$i$, the account signature or identification information is provided to the customer. In one or more embodiments, the account signature is mailed to the customer, told over the phone by a customer representative of the account provider to the customer, or is transmitted electronically to the customer. As described below, in the event the customer is provided with an account access media, then the account signature may be provided on the account media. The account signature may be printed on, embossed in, or encoded on the account media or an element associated therewith.

In a step S1$j$, an account access code is generated and associated with the account. In one or more embodiments, the account provider generates the access code. In other embodiments, the customer generates the code and provides it to the account provider. The access code may comprise a personal identification number or "PIN" comprising one or more letters and/or numbers.

In a step S1$k$, the access code is provided to the customer. In the case where the customer selects the access code, this step is completed at the same time as step S1$h$. When the account provider generates the code, the code may be mailed, electronically transmitted or spoken to the customer.

In a step S1$l$, in one or more embodiments, the customer is provided with an account access media. The access media may comprise a card, check, ticket, chip or a wide variety of other items. In one or more embodiments, the account signature is associated with the access media. When the access media comprises a card, check or the like, the account signature and/or account may be printed or encoded thereon. The account signature may be provided in one or two-dimensional bar code form or be encoded in a magnetic stripe or a chip or other data storage element associated with the media.

The account signature and/or access code may comprise a physical characteristic of the customer. For example, the access code may comprise a fingerprint or the customer's retinal features. In general, the account number, signature and access code are for use in identifying the particular account and ensuring that only those parties with authority to access an account can do so. A variety of other methods and devices may be used for these purposes.

In one or more embodiments, the method need not include all of the above-referenced steps. A variety of other steps and may be associated with the establishment of an account for the customer, and the steps described above need not be completed in the order in which they were described.

In the above described embodiment, an account number, account signature and access code (i.e. PIN) are used to identify and gain access. For example, in one arrangement, only an account identifier, such as an account number, is assigned and used to gain access to an account. In another embodiment, a PIN is also utilized. In one embodiment, an account number may be used to gain access to an account via a customer service representative. A more complex account signature may be associated with an access media for gaining access to the account, as the user need not remember the complex account signature if it is stored and readable.

Referring again to FIG. 1, in a step S2, an account which the customer wishes to access is activated. Normally, this step will be in response to a customer wishing to access a newly established account.

Referring to FIG. 1(a), there is illustrated one embodiment of a method of activating an account in the event the account has not been activated. In a first step S2a, the customer accesses the account. In one or more embodiments, this step comprises a customer contacting the account provider, such as via a website of the account provider or by telephone with a customer service representative.

In a second step S2b, the customer provides their account number, signature and, in one or more embodiments, the access code. This account identification and access data may be provided by a customer telling an account representative the information, typing the information into a data input accepting element of a graphical user interface of a website, or otherwise transmitting such to the account provider. In one embodiment, the account number and signature may be scanned off of an account media provided the customer, such as with a magnetic stripe or bar code reader.

In a step S2c, the account provider activates the account. In one or more embodiments, this step comprises associating data with the account which indicates that the customer and/or other designated and/or appropriate parties may utilize and access the account.

The account activation may be accomplished in a wide variety of other manners. For example, in one embodiment, a customer may activate an account by simply calling a phone number of the account provider or entering the appropriate data into the account provider's website. In this arrangement, it is not necessary for the customer to access the account or provide all of the account information which may be necessary for the customer to use the account.

In one embodiment, an account may be activated for use by a customer at the time it is established. When the account is created, it may automatically be activated by the account provider.

In such an arrangement, any access media associated therewith may be separately activated. For example, the account may be activated when established, allowing a customer to make deposits, funds transfers or the like through an account provider representative or website. However, the customer may not be permitted to utilize an account media (such as for purchases or cash withdraws) until the customer activates the account as to the media. The customer may activate an access card by calling a representative of the account provider after the card is received or other means.

Referring again to FIG. 1, in a step S3 it is determined if a customer wishes to access an account, as by a customer's attempted use of the account. This step may be remote in time from step S2, or at the same time. For example, a customer may activate an account shortly after establishing it, but not access the account for several days or weeks thereafter. A customer may also wish to activate an account and utilize it at the same time, such as when the customer wishes to pay for a purchase at a store.

In one or more embodiments, this step comprises determining if a customer is accessing a bank, automated teller, customer service representative, account provider website, remote payment station, gaming machine or the like. In order to determine if the customer is attempting to access an account, particular account information and associated access data is required. This data may be provided to the account provider or other account access controlling entity in a number of manners. In one or more embodiments, the account information may be directly provided by the customer, as through data input into a website or spoken to an account representative, or by reading the information from the access media.

The customer may wish to access the account for a number of reasons. For example, in the event a customer wishes to complete a purchase from a vendor, such as on-line or at a store, the customer may seek to access the account to pay for the purchase. The customer may seek access to the account to obtain funds from an automated teller machine.

In one or more embodiments, data must be provided to the account provider to establish the entitlement of the customer to access the designated account. This information may comprise the account signature and/or access code. Again, the particular means and/or method by which this information is provided may vary. In an embodiment where a customer is seeking to access an account using an access media, the account signature may be read or scanned from the card, and the access code may be provided by the customer, such as through a keypad. The customer may also provide such information through a variety of data input devices, such as a computer or customer station at a store, or provide the information directly to an account representative.

When a customer wishes to access an account, in a step S4 it is determined if the access to the account is permitted. In one or more embodiments, and referring to FIG. 1(c), this step includes a step S4a of determining if the provided account access information is correct and complete. In one or more embodiments, this step comprises comparing the provided account identification and/or access information to that associated with the account which the customer is seeking to access. If the required information has not been provided or is not correct, access to the account is denied. The customer may then be directed to contact the account provider and/or attempt to re-enter the required data in case there was an error in providing or transmitting it to the provider.

If the requisite access information is provided, then in a step S4b, it is determined if the account is closed. If the account has been closed, then access to the account is denied. The account may be closed at the request of the customer, upon violation of account terms and conditions or for a wide variety of other criteria or reasons.

If the account is not closed, then in a step S4c, it is determined if the account is expired. The account may be determined to be expired if a current date is the same as or timewise later than the expiration date assigned to the account. If the account is expired, the customer is not permitted to access the account directly. Preferably, in that situation, the customer may access the account only through the account provider. The customer may contact the account provider and arrange for the removal of any funds remaining in the account. Alternatively, the customer may be permitted to re-activate the account with a new expiration date.

If in step S4 it is determined that access is permitted to the account, then in step S5, the customer is permitted to utilize the account. As described below, a variety of transactions, interactions with and manipulations to the account are permitted.

Referring to FIG. 1(d), in one or more embodiments, in a step S6, a customer is permitted to utilize the account to make a payment to a third party. A variety of methods may be implemented to effectuate this step. In one or more embodiments, in a step S6a, it is determined if the account is a charity account. If so, in a step S6b, funds are transferred from the charity account to a selected charity.

In one or more embodiments, when a charity account is established, the account provider designates the account a charity account. At that time, a customer may designate one or more charities to which funds placed in the account are to be distributed to. These funds may be distributed in accordance with the specific instruction of the customer at a later date, or at a predetermined time or in accordance with a predetermine schedule. The amount of the funds to be distributed may be designated by the customer as well. In one or more other embodiments, the customer may designate the charity(ies) to which funds are to be distributed after the account has been established.

In one or more embodiments, the funds which are distributed to the charity are transferred electronically from the account by the account provider to an account belonging to the charity or an intermediate escrow account or the like from which the charity may obtain payment. In other embodiments, the funds may be mailed or transmitted in other manners.

If the account is not a charity account, then it is determined in a step S6c if the account is a promotional account. If the account is a promotional account, then in a step S6c, the account may be used to purchase or pay for goods from specific parties. Preferably, the account provider must verify that the purchase is being made from one of the authorized parties. Normally, when the purchase is being made, the vendor will transmit vendor identification information along with the customer's account information. The account provider can verify the vendor from the provided vendor information.

If in step S6c it is determined that the account is not a promotional account, then it is determined that the account is a customer or allowance account which may be used as the source of payment for a transaction with, in general, any party. In step S6e, the purchase or other transaction is then facilitated by debiting the account.

It will be appreciated that a variety of steps other than those described may be associated with the payment of a purchase from the account. For example, in one step, the account provider must generally verify that sufficient funds exist in the account to permit the transaction. If sufficient funds do not exist, then the transaction may not be permitted. Alternatively, as described below, the account may be provided with a "credit" or "overdraft" feature which would still permit the customer to access the account.

As part of the transaction, the particular vendor may send information which facilitates the transfer of funds from the customer's account to the vendor's account by the account provider. For example, this information may comprise a vendor identification or account number.

As provided above, the method and apparatus by which the customer accesses the account to facilitate a purchase may vary. For example, if the customer is purchasing goods at a store, the customer may swipe their access media through a card reader and enter their access code. If the purchase is through a web-site or similar on-line access, the data may be input into a graphical user interface of the site. In one embodiment described in greater detail below, the apparatus may include a system for use in a casino or other gaming environment.

In accordance with one or more embodiments of the invention, the payment for purchase may be arranged as an automated debit from the account. For example, a customer may arrange for payments to be made from the account on a periodic basis, such as in response to monthly amounts due a party (such as for a car payment or the like). In such event, the customer may provide the necessary debit information to the account provider.

In one or more embodiments, a purchase may be made in the form of an automatic funds transfer. For example, a customer may arrange with a particular vendor an arrangement where payment for the goods or services is made automatically. The customer provides the vendor with the account data which is then used by the vendor at one or more times subsequent thereto to affect payment. As an example, a customer may provide account data to their electric company. The electric company may then receive payment for the electricity supplied to the customer each month directly from the account through the account provider without intervention by or acts required by the customer. In this embodiment, the step of the customer accessing the account, step S3, generally comprises the customer providing the account data to the vendor or other party and then the vendor accessing the account as agent of the customer.

As one aspect of utilizing the account, as illustrated in FIG. 1(d), in a step S7, in one or more embodiments a customer may deposit funds into the account. A variety of methods may be implemented to effectuate this step. In one or more embodiments, this step includes a step S7a of determining if the account is an allowance type account. If so, then in a step S7b, funds are periodically transferred into the account. If the account is an allowance account, a customer will have provided the account provider with a source of funds from which a transfer into the account is to be made. The source of funds may be a customer's credit card, a bank account, or another account in accordance with the present invention. The customer will also have provided the account provider with specific instructions as to when funds are to be deposited, in what amount and the like.

If the account is not an allowance type account, then in a step S7c, the customer must specifically arrange for the particular transfer of funds with the account provider. For example, the customer may access a web-site or customer representative and provide source funds data. This data may comprise credit card information, bank account and routing information or the like. The customer may also arrange for funds transfer between accounts at a bank or similar provided customer station, phone controlled system or the like.

As one aspect of utilizing the account, as illustrated in FIG. 1(d), in a step S8, in one or more embodiments a customer may withdraw funds from the account. A variety of methods may be implemented to effectuate this step. In one or more embodiments, the funds withdrawal may comprise the issuance of currency such as U.S. or other dollars, or other media. In one or more other embodiments, the withdrawal may comprise the transfer of funds to another entity or account.

In general, when the customer desires to obtain currency, the customer travels to an automated teller machine (ATM), bank or similar currency dispensing location. In such event, the step of providing the requisite account data (see step S3) may comprise swiping an account media and inputting an access code. In the event the customer does not have an access media, the customer may provide the requisite data directly to a teller or other bank personnel for input into a system.

If the customer desires to withdraw funds and have the funds transferred into another account, the customer may be permitted to do such over the phone, via the account provider's web site, or at a bank or other location. In this regard, the number of locations at which a customer may effectuate the transfer is not constrained to locations where currency can be dispensed.

If the customer requests funds, and if such funds exist in the account, the customer is provided with funds. This step may include the step of transmitting the funds request to the account provider and the account provider comparing the amount of funds requested versus the total amount of funds in the account. If the funds exist, then the account provider may send a signal or other indication that it is permissible to dispense the funds.

In one or more embodiments, the customer is permitted to request currency or a transfer. If currency is requested, then currency is dispensed. If a transfer is requested, then the funds may be transmitted electronically to a new account. In the event the funds are to be transferred to another account, the customer provides the necessary information, such as the receiving account number and/or routing number and/or receiving party information.

As one aspect of utilizing the account, as illustrated in FIG. 1(d), in a step S9, in one or more embodiments a customer may obtain account information and manage their account. A variety of methods and devices may be utilized to effectuate this step. For example, a customer may call an automated telephonic information system, call a customer service representative or access a web site belonging to the account provider. In one or more embodiments, certain information and transactions may be permitted through an automated teller machine or similar remote access site.

In one embodiment, this step may include one or more of the following steps. In a step S9a, a customer may be permitted to obtain their account balance. The account balance may be provided on a viewing screen or printed on paper.

In one or more embodiments, in a step S9b, a customer may obtain the account limit for their account. The limit value may be displayed to the customer if the customer is located at a display, or may be printed onto a media, such as paper, and dispensed or mailed to the customer. If the customer is utilizing a phone system, the information may be transmitted over the phone.

In one or more embodiments, in a step S9c, a customer may change information associated with their account. This information may comprise their name, address, telephone number, the name(s) of parties permitted to access the account and the like.

In a step S9d, a customer may change their access code or similar access information. For example, in one embodiment, the account provider may assign the customer the access code when the account is established. In accordance with this step, the customer may change this access code to a code of their selection.

In a step S9e, a customer may obtain information regarding transactions associated with the account. This information may include information regarding fund deposits, withdraws and other transactions. In one or more embodiments, the customer may obtain information regarding an amount paid or transferred out of the account, the date of the transfer and the party to whom the amount was paid or transferred. The customer may obtain information regarding an amount deposited or transferred into the account, the date of the transfer and the origin of the funds.

In a step S9f, a customer may close the account. When closing the account, the customer may indicate to the account provider the location to which any funds remaining in the account are to be transferred.

In a step S9g, a customer may re-activate an account in order to change its expiration date. For example, before an account expires, a customer wishing to utilize the account for a longer period of time may elect to re-set the expiration date for the account. In one or more embodiments, the date is automatically set by the account provider, such as by adding a period of time to the current expiration date or the current date. In one or more other embodiments, the customer may select a new expiration date in the future.

As one aspect of utilizing the account, as illustrated in FIG. 1(c), in a step S10, in one or more embodiments a customer may change the status of the account. A variety of methods may be implemented to effectuate this step. In a step S10a, a customer may change the account type, such as from a customer account to a charity or other account, or vice versa. In a step S10b, a customer may merge one account with another account. For example, a customer having two accounts may wish to merge the accounts into a single account. A customer having one account may establish another and then merge or eliminate the first account in favor of the second.

Several examples of account merging are provided below:

| John Doe's Debit Accounts | | |
| --- | --- | --- |
| Account Type | Balance | Status |
| $250 Debit Account | $100 Remaining | Active until Jan. 01, 2001 |
| $150 Debit Account | $50 Remaining | Active until Apr. 01, 2001 |
| After merging accounts into a new account: | | |
| $250 Debit Account | $0 Remaining | Closed |
| $150 Debit Account | $0 Remaining | Closed |
| $150 Debit Account | $150 Remaining | Active until Jun. 01, 2001 |

Alternatively, the owner of the accounts may wish to transfer the $100.00 remaining from the $250 account into the $150 account with $50.00 remaining. This would close the $250 debit account and establish a new balance of $150 in the $150 debit account. An example of this transaction is as follows:

| John Doe's Debit Accounts | | |
|---|---|---|
| Account Type | Balance | Status |
| $250 Debit Account | $100 Remaining | Active until Jan. 01, 2001 |
| $150 Debit Account | $50 Remaining | Active until Apr. 01, 2001 |
| After transferring the remaining amount into the $150 account: | | |
| $250 Debit Account | $0 Remaining | Closed |
| $150 Debit Account | $150 Remaining | Active until Apr. 01, 2001 |

A customer may also be permitted to close the account. If the account is empty, the account is simply closed by the account provider so that further access to the account by the customer is prevented. In the event funds exist in the account, the customer may be provided with the option of transferring the funds to another location or account, or obtain the funds from the account provider by mail.

In accordance with one or more embodiments of the invention, the account provider may provide a credit line or "overdraft" protection for the account. This option may be provided to the customer for free or upon payment of specific service charges. In accordance with this embodiment, in the event a customer wishes to withdraw funds from the account (whether to obtain currency, transfer to another account or payment for goods/services) in an amount greater than that which exists in the account, the account provider may supply the funds to the customer.

In one or more embodiments, the account provider may charge the customer a specific fee for utilizing the credit line, such as a per usage fee, interest or the like. In one or more embodiments, after a particular transaction which exceeds the amount of funds in the account, the account is frozen until sufficient funds are placed in the account or provided to the account provider to cover the funds deficiency.

One or more embodiments of the invention comprise apparatus for use in performing the above-described methods. As stated above, this apparatus may include an access media, such as a card, check, chip or the like. The apparatus may also include a wide variety of devices for interacting with the account provider and/or account. These devices may include some existing devices, such as existing bank teller machines, card reading devices, and data receiving and transmitting devices.

In one embodiment, the apparatus includes a computing device. The computing device includes a memory for storing data. Preferably, the data comprises files of information representing accounts and account information. Means are provided for effectuating the methods of debiting, crediting and manipulating/managing the accounts. In one embodiment this means comprises software, such as machine-readable program code, for effectuating these tasks.

In one embodiment, the computing device may be associated with a network or system. The network may include the Internet, a LAN, WAN, or devices connected by dedicated line or other means of communication.

In one or more embodiments, a customer is permitted to establish and interact with their account via a website or similar on-line access. The website may include a graphical user interface designed to provide information to the customer and prompt and accept that information. The website may have multiple levels or pages. For example, the website may have a home page or "log-in" page which prompts a customer to either identify that they are a new customer and wish to establish or activate an account or identify themselves as an existing customer and have them provide the requisite account information.

If the customer is a new customer, the customer may be sent to a webpage at which information is provided to the customer about the various accounts which may be established. This or other pages may include prompts for providing the data necessary to establish an account.

If the customer is an existing customer and provides the necessary information to access the account (as in Step S3-S5 set forth above), then the customer may be presented with a menu page. At this page the customer may be presented with a menu of items from which to select. These items may be similar to those of steps S7-10. For example, a customer may be provided with a "manage account" item. Upon selecting this item, the customer may be presented with a number of sub-menu items. These items may comprise those items identified in steps S9a-f.

In one or more embodiments, a webpage may display account information for more than one account belonging to a customer. A variety of means may then be presented to the customer for use in manipulating these accounts. For example, a customer may then be permitted to "drop and drag" funds or the like from one account to another.

As indicated, the account provider may have one or more devices adapted to store account information and receive and transmit account data, data representing funds transfers and the like. The data storage device may comprise one or more hard drives or similar elements used to store account data. Modems, servers or similar devices may be used to transmit and receive data.

The devices used to implement the present invention may be incorporated into existing systems facilitating monetary and commercial transactions. For example, the access media associated with an account in accordance with the present invention may be utilized with current card-reading devices.

In accordance with one or more embodiments of the invention, an account provider may issue accounts associated with access media which are available for purchase by customers. For example, an account provider may associate an account with an access media. The access media may have associated therewith an expiration date, account data and a maximum value. A customer may "purchase" the account and associated access media at a retail location. When the account provider is a bank, the bank may place access media on sale at retail locations such as grocery and retail stores.

A customer purchases the account and card by paying the retailer (who in turn pays the account provider). In one or more embodiments, the customer may thereafter access the account by activating the account. This may comprise calling the account provider after purchase. At that time, the account provider may provide the customer with an access code for use in using the access card. The access code could be provided on the card, but this arrangement has added security in that the account provider can ensure that the account is only accessed once it has been paid for.

In this embodiment, a customer may conveniently obtain a "pre-paid" account for themselves or for another party. The account may be used in similar fashion to a credit or ATM card, permitting purchases from any vendor and permitting access to cash from any of a variety of cash-dispensing locations.

It will be noted that in this embodiment, the step of establishing the account is generally accomplished by the account provider without input from the customer. In one or more embodiments, after purchasing or obtaining the access card, a customer may be required or permitted to provide additional information in order to access the account.

As indicated, in one embodiment of the invention, the access card or media may indicate an expiration date thereof and/or the associated account. If the access media and/or associated account is expired, the purchase is not permitted. If the access media is about to expire, the customer may purchase it and, if the customer wishes to extend the expiration date, contact the account provider after purchase to do so. In one or more embodiments, the expiration data may not be printed on the access media, but when it is purchased scanned, read or the like by the vendor to ensure that it is still valid. When a purchase of an access media is made, the expiration data may then be reset a predetermine time from the purchase, with this information scanned onto the card or otherwise associated with the account.

In the above-described arrangement, each access media, once paid for, generally has the same characteristics as cash. A customer may pay for goods using the purchased access media. A customer may deposit the funds associated with the access media into another account, or transfer it to another party.

One or more embodiments of the invention comprise a method and apparatus for permitting and tracking or monitoring financial, reward and other transactions in casino or gaming environment. One or more embodiments of the invention comprise specific or related implementations of the methods described above and illustrated in FIGS. 1-1(*d*).

Applications of these methods and other methods of the invention are described below. In one embodiment, the methods may be implemented via a casino player financial and award transaction system 100 as illustrated in FIG. 2.

Figure 2:
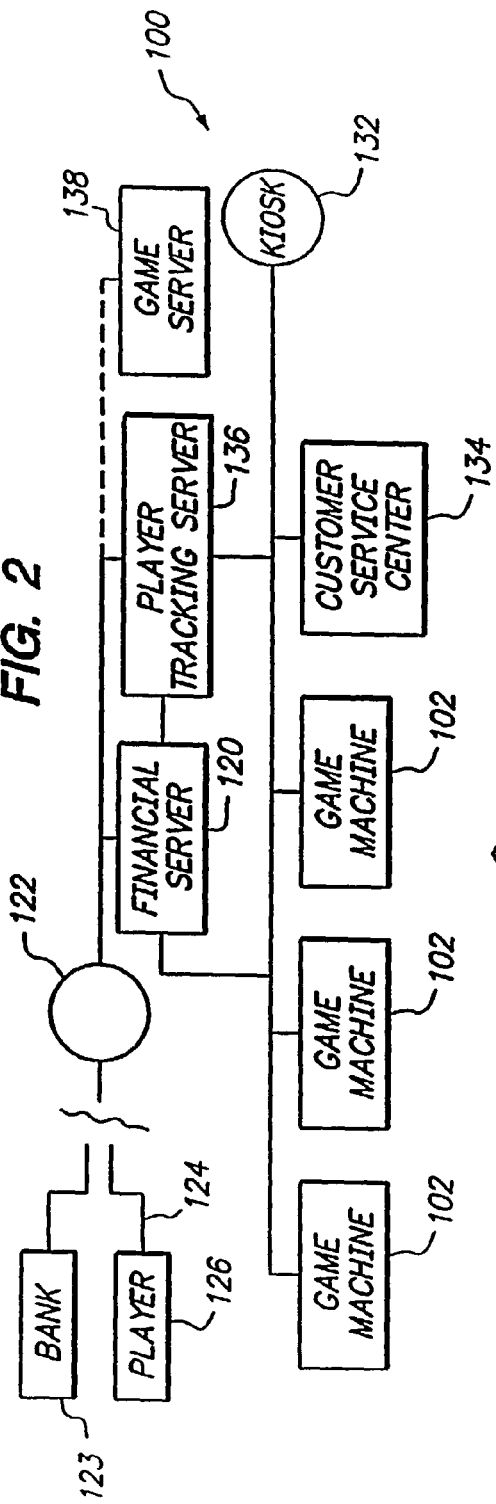
FIG. 2 illustrates a player financial and award transaction/monitoring system in accordance with an embodiment of the invention.
Figure 3:
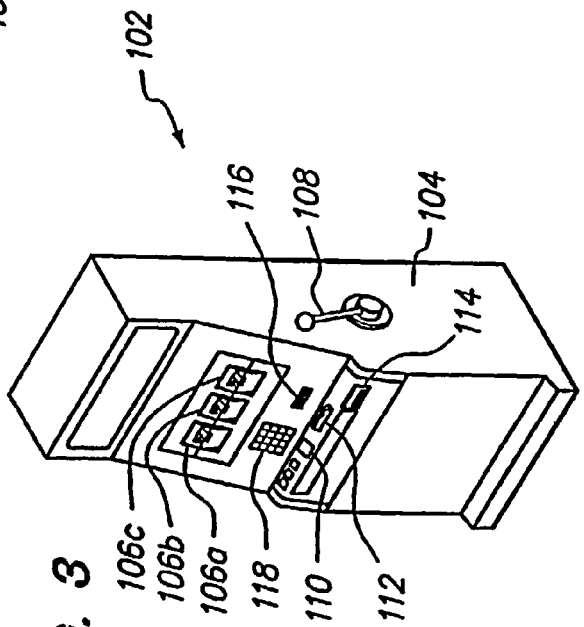
FIG. 3 illustrates a gaming machine which may be utilized in the system illustrated in FIG. 2.

Referring to FIG. 2, in a preferred embodiment, the system 100 includes one or more gaming machines 102 or other gaming devices. FIG. 3 illustrates in greater detail one embodiment of such a gaming machine or device 102. In general, the gaming machine 102 is adapted to present at least one game for play to a player. As illustrated, the gaming machine 102 includes a housing 104 which supports and/or houses the various components of the gaming machine 102. In the embodiment illustrated, the gaming machine 102 is adapted to present a game of "slots," and includes three rotating reels 106*a,b,c*. A handle 108 or spin button 110 may be used to effectuate rotation of the reels 106*a,b,c*.

In this well known game, a player may be declared a winner of the game and awarded an award if the result of the rotation of the reels 106*a,b,c* is a predetermined combination of symbols. It should be understood that the gaming machine 102 may be adapted to present one or more of a wide variety of games. Depending upon the game presented, the configuration of the machine may vary. For example, in the event the gaming machine 102 is adapted to present the game of video poker, then the gaming machine 102 may include a video display.

In one or more embodiments of the invention, the gaming machine 102 is adapted to present a wager-type game. In this arrangement, a player is required to place a bet or wager in order to participate in the game. In the event the outcome of the game is a winning outcome, then the player may be provided with an award such as coins or currency, or credits which may be redeemed for prizes or money. In one arrangement, the award may be winnings in proportion to the amount wagered or bet by the player.

In order to accept a wager, the gaming machine 20 may include a coin acceptor 112 for accepting coins. The gaming machine 20 may also include a bill acceptor or validator 114 for accepting paper currency. In a preferred embodiment, the gaming machine 102 is also provided with means for accepting input regarding an account, such as a card reader 116 for reading an access media in the form of a card including a magnetic stripe. If the access media has another form, then the input device may be suitably arranged, such as a bar code reader for reading a printed bar code.

In one embodiment, the card reader 116 is associated with a player tracking system. In another embodiment, the card reader 116 may be separate from a card reader or other device associated with the player tracking system.

In a preferred embodiment, the gaming machine 102 is associated with a player tracking system. Such a system may also be referred to as a player reward or player loyalty system. The details of this system are described in more detail below. In general, the player tracking system includes a gaming machine player tracking device associated with a player tracking host system via a network including a communication link.

The player tracking device of the gaming machine 20 also includes a card reader. As indicated, in one embodiment the card reader of the player tracking device is the same as the access media card reader 116.

In one embodiment, the gaming machine 102 includes one or more additional input devices. The gaming machine 102 preferably includes a keyboard or keypad 118 which permits input from a player. The keypad 118 permits input of an account access personal identification number (PIN).

The gaming machine player tracking device may have a variety of other configurations and include the other devices.

Referring again to FIG. 2, in one embodiment the system 100 includes a plurality of gaming machines 102. Preferably, each gaming machine 102 is associated with one or more other devices through a wired or wireless communication network including at least one communication link.

In one embodiment, each gaming machine 102 is in communication at one or more times with a financial transaction host 120. The financial transaction host 120 may comprise a single computer or a group of computers associated with one another on the network. Appropriate hardware and/or software is provided for permitting the one or more computing devices of the financial transaction host 120 to send and receive information. For example, in one embodiment, data may be sent to and from the financial transaction host 120 in accordance with any number of protocols, such as TCP/IP, Ethernet, IEEE-1394, Bluetooth and others. Appropriate hardware and software is provided for implementing these protocols. Of course, the communication protocol and the form of the network are chosen in tandem. For example, the Bluetooth protocol may be implemented with a wireless network including wireless data relay stations. An IEEE-1394 protocol may be implemented over a wired network, such as copper wire or fiber optic lines.

In one embodiment, the financial transaction host 120 includes at least one data storage element for storing the account information. The data storage element may comprise a hard drive, RAM, tape drive, CD-ROM, DVD-RAM or other memory or data storage member or element. The financial transaction host 120 may include a number of other devices, such as one or more displays, keyboards and other devices for displaying data, controlling operation thereof and the like.

In one embodiment, the financial transaction host 120 includes hardware and/or software for creating financial accounts such as described above, and for implementing account transactions, as also described herein. In one embodiment, the financial transaction host 120 is associated with one or more additional networks besides that including the gaming machines 102.

In one embodiment, the financial transaction host 120 is associated with the Internet and one or more closed or partially closed networks, such as financial/banking networks. In one embodiment, the financial transaction host 120 includes a communications gateway 122. The gateway 122 is preferably adapted to permit communications between the financial transaction host 120 and other devices where the communications protocol may be different. For example, the casino player financial and award transaction system 100 may employ a IEEE-1394 communication protocol. On the other hand, the host 120 may be adapted to receive information from and transmit information to the Internet, which utilizes a TCP/IP protocol.

In one embodiment, communications pathways may be provided between the financial transaction host 120 and a variety of devices in a variety of manners. For example, communications may be permitted via phone line or dedicated line. A player or customer may access the financial tracking host 120 via the Internet 124 from a remote location 126. A player may also access the financial transaction host 120 via a direct line, such as a direct-dial phone line connection. Connections with other financial institutions 128 may be by dedicate or secure lines 130.

In one embodiment, the system 100 includes one or more kiosks 132. Such a kiosk 132 may comprise an apparatus at which a player may gain access to the financial transaction host 120. The kiosk 132 may have a variety of forms. In one embodiment, the kiosk 132 may comprise a computing device including a processor, display, and at least one communication interface with the system 100.

In one embodiment, one or more customer service centers 134, such as cashier booths, mobile stations or the like may be associated with the system 100. Preferably, a player may engage in one or more transactions at such a center 134, such as depositing funds into their account.

In one or more embodiments, the system 100 includes a player tracking or reward system host 136. The player tracking or reward system host 136 is in communication with the player tracking device of each gaming machine 102 via the at least one communication link of the system.

In like fashion to the financial transaction host 120, the player tracking host 136 may comprise a single computer or a group of computers associated with one another. Appropriate hardware and/or software is provided for permitting the one or more computing devices of the player tracking host 136 to send and receive information. In one embodiment, the player tracking host 136 includes at least one data storage element for storing the player information. The data storage element may comprise a hard drive, RAM, tape drive, CD-ROM, DVD-RAM or other memory or data storage member or element. The player tracking host 136 may including a number of other devices, such as one or more displays, keyboards and other devices for displaying data, controlling operation thereof and the like.

In one embodiment, the player tracking host 136 and the financial transaction host 120 may comprise the same apparatus or group of apparatus. In the embodiment illustrated, the player tracking host 136 and financial tracking host 120 are separate, but in communication with one another. In one embodiment, some but not all of the components of the hosts may be shared, such as a memory or data storage device or devices.

In one embodiment, the player tracking host 136 is adapted to implement a player tracking/reward or "comp" function. The player tracking host 136 may thus be adapted to aggregate game play data regarding various players playing the gaming machines 102. This data may include information such as the length of time of game play, amounts bet, amounts awarded, and a wide variety of other information. In general, the player tracking device of each gaming machine 102 is adapted to transmit the player tracking data over the communications link(s) to the player tracking host 136. Based on player activities, a player may be awarded a "comp". Comps are generally awards, such as prizes, money, free game play, lodging or the like which are provided to the player apart from any awards which the player receives from direct game play. Such are referred to as "comps" as they are "complimentary" and generally do not require specific obligation, such as an additional bet, in order to be received. The system is often referred to as a reward or loyalty system because a player is generally awarded an award resulting from extended or frequent game play. In one arrangement, a player may acquire points based upon a game criteria, such as amounts bet, won or lost. If a player accrues sufficient credits, the player is awarded a reward.

Preferably, one or more data files are stored at the memory (or other data storage device/element) which is located at or in association with the financial transaction host 120. In one embodiment, the data file corresponds to a player. The data file is accessible or identifiable by identification information, such as an account number or player identifier.

As described herein, this identifier may be stored on a player card. As detailed above, in one embodiment a password, player PIN or the like may be required to access an account or file in addition to the player identifier. In one embodiment, the player PIN is stored at the data file and is used to confirm the PIN entered by the player.

In one embodiment, a player may have more than one account. Each account may be represented by one or more different data files. In another embodiment, the information regarding all accounts may be stored in a single data file. Different identifiers or different PINs may be used to identify and access each account.

Where a single host or server is provided for both financial and reward/tracking functions, the data files or accounts may include both information regarding a player's finances and game play information, such as rewarded points. Where separate servers or hosts are provided, separate or different accounts or files may be provided. In one or more embodiments, certain aspects of the invention may be implemented without any player tracking host at all.

In one embodiment, the system includes data files containing information regarding credits or monies which the player may use to play a game or obtain other goods or services. In one embodiment, the credits or monies may have been deposited by the player. The credits or monies may also be awarded or rewarded, or purchased, as described below.

Means are provided for deducting credits or monies which are used by a player. This means may comprise software, such as computer program code. In one embodiment, a signal is transmitted from a gaming machine to the financial transaction host 120 in response to input from a player to place a bet (such as by pressing a bet button at the game). If the player has credits associated with their account, a signal is transmitted back to the gaming machine 102 approving the bet, and the monies or credits are deducted from the player's account. The deducted monies may be tracked for accounting purposes, such as by crediting the debited amount to a casino account or holding account.

Means are also provided for crediting monies or credits which are won by a player. This means may again comprise software. When a gaming machine indicates a win, the amount won may be credited to a player's account.

In one or more embodiments, means may be provided for assigning account criteria and determining if account criteria are met. As noted above, such criteria may comprise a limit on the amount of funds which may be debited from an account during a period of time, that no winnings are to be credited to the account, that a portion of funds credited are to be donated to a charity, that tax withholding is to be removed from all winnings, or a wide variety of other criteria.

In a preferred configuration of a system of the invention, each player is provided with a single access media, such as a player card. By using this single card at a gaming machine, both financial transaction and player tracking/reward functions are enabled. If a player has more than one account, such as a debit financial account for playing games and a credit account to which winnings are paid, then when playing the game the system is adapted to use the player's main or debit account. A player may still access and manage all of their accounts, such as remotely from a computer, at a kiosk or customer service location. In one embodiment, a player may need to utilize a different identifier to access other accounts. For example, such accounts may be provided with other account numbers, or the players PIN number may differ for accounts all having the same main account number.

In one embodiment, the system is arranged to permit a player to access all of their accounts once their single identifier (such as account number) and PIN (if necessary) are provided. For example, the system may generate and send information to the player for display on a display screen. This information may include information regarding all of the player's accounts. A player may then select a particular account to manage, such as for causing the system to display detailed information regarding that account.

It will be appreciated that a system for implementing one or more methods of the invention, including specifically in a gaming environment, may vary from that described and illustrated. In one embodiment, the system may be adapted to include table and other types of gaming devices.

One or more methods of the invention specifically relating to the casino or gaming environment will now be described. Referring to FIG. 1, in one embodiment, a casino patron or player may establish an account with a casino. As noted above, there are a variety of ways for a player to establish an account, including registering on-line (such as over the Internet) or at the casino or a kiosk.

With respect to the casino or gaming environment, a wide variety of accounts may be established. These accounts may have a wide range of criteria associated therewith. For example, a player may set up a player account in similar fashion to a general customer account. This account may be arranged to permit both withdrawals and deposits, and may or may not have a limit associated therewith.

One particular account which may be permitted is a limit account, which permits only a predetermined amount of withdrawals over a period of time. For example, the account may permit a player to withdraw only $500 per month. A player may wish to establish such an account to limit their total expenditures over time.

Another account may have a deposit limit. The deposit limit works in a similar fashion to a limit account, except that the maximum amount which may be withdrawn is limited by the maximum amount which may be deposited. For example, the account may have a limit of $100, permitting a player to only deposit $100. In one embodiment, the limit may be for a predetermined period of time, such as a maximum of $100 per month, with the total amount which may be associated with the account increasing over time. An account with a deposit limit may have a deposit limit only for the player. If a player wins a large jackpot, for example, the casino may credit the jackpot to the account even though the jackpot exceeds the deposit limit.

In one embodiment, the account may be provided with special features which are associated with linked accounts. For example, a player may be permitted to designate a particular portion of their winnings to a charity account, account for treatment of gambling addiction or the like. The account may have criteria for transferring 1% of all winnings deposited into the account to such other accounts. Other amounts may be transferred, and the time of the transfer may vary, such as at periodic times or at the time the winning is credited.

In one or more embodiments, a player's financial account may also comprise a player tracking account. In this arrangement, the account may be associated with one or more files not only delineating the financial aspects of the account, but also information typically contained in a player's player tracking file. The player tracking information may include player identification information, generally common to the financial data. The player tracking information may also include information such as the length of time a player has played a game, the amounts won and/or lost, information regarding past game play, calculated theoretical win and loss information, and other information as is known in the art. Alternatively, a player's tracking and financial accounts may be linked.

As noted above, in a preferred arrangement, a player is issued a single access media which is associated with both the financial account and player account (whether such accounts are separate or merged). In this arrangement, activities associated with player tracking and financial accounting may occur simultaneously from the player's perspective. Referring to FIGS. 2 and 3, a player may travel to a gaming machine 102 and insert their player card into the card reader 116. In response to the card insertion, the player tracking device at the gaming machine 102 may be caused to request input of a player's identification or PIN number. This requested may be displayed on a video display at the gaming machine.

The player may input their PIN via the keypad 118 at the gaming machine 102. The player's account identifier (such as account number) reader from the card and the player's inputted PIN are then transmitted from the gaming machine 102 to the financial transaction host 120 and/or player tracking host 136. The financial transaction host 120 and/or player tracking host 136 may then verify the identity of the player and entitlement to use the card (such as by verifying the inputted PIN against the player PIN stored in a file associated with their account).

A player may then engage in the play of a game. In a game requiring a bet or wager, the player may first attempt to place a bet, such as by pressing a "bet" button at the gaming machine 102. In response to a request to place a bet, the gaming machine 102 may send a signal to the financial transaction host 102 for verification that the player has sufficient funds (i.e. credits or monies) associated with their account to place the bet. If so, then the bet amount may be credited to the gaming machine, and the bet amount may be debited from the player's financial account.

If the accounts does not include sufficient funds, the player may be notified, such as by a visibly displayed or audio notification. The player may then provide an alternate method of payment, such as insertion of coins or bills. The player may also travel to a cashier cage and deposit funds into their account.

In one embodiment, a player may be permitted to deposit funds into their financial account at the gaming machine 102. A player may insert coins or bills, and have the deposited amounts credited directly to their account.

In one embodiment, the financial transaction host 120 may transmit credit information to a gaming machine 102 regarding the total credits in the account belonging to or useable by the player. The number of credits may be adjusted based upon the denomination of bets which the gaming machine accepts. For example, if a player has $100 in their account and begins playing a 25 cent minimum bet slot machine, then the machine may indicate that the player has 400 credits.

Advantageously, while the player plays the game, the player tracking host 136 may track the player's play. For example, the gaming machine 102 may transmit game play information such as length of play time to the player tracking host 136.

In the event the player is awarded winnings while playing a game, then those winnings may be paid directly to the player in a manner commonly known, or may be credited to the player's account. For example, if a player wins 400 credits while playing a 25 cent machine, the player's account may be credited $100. As noted, the manner by which winnings are credited may depend upon criteria associated with the account. If the player has a charity function, 1% or $1 of this winning may be credited to the appropriate charity account and the remainder to the player's financial account. If the player wishes, the winnings may be deposited in a separate winnings account belonging to the player. Such an account may be arranged to prevent withdrawals at a gaming machine. In this manner, a player may play until the funds in their main account are exhausted, and then the player may obtain their winnings from play of the main account moneys.

In a preferred embodiment of the invention, a player may access their account and engage in a wide variety of activities in similar manner to that illustrated in FIG. 1(*d*). For example, a player may be permitted to access their account from a remote location. Referring to FIG. 2, a player may be permitted to access their account via the Internet. The financial transaction host 120 may be configured to generate a graphical user interface which is displayed to the player and via which the player may provide input.

The player may be provided with a variety of options. In one or more embodiments, a player may be entitled to make changes to their account, such as change their PIN, address or the like. A player may also be able to deposit funds. In one embodiment, a player may provide bank account or credit card account information which is then used by the financial transaction host 120 to effect an electronic funds transfer to their account via a separate financial communications link.

A player may be able to change characteristics of their account, such as limits on withdrawals. In some instances, changes may only be made by or with the permission of the account provider.

A player may be permitted to move funds between accounts. For example, a player may be permitted to withdraw funds from one of their accounts and move the funds to another of their accounts or to the account of another party.

In a preferred embodiment, a player is permitted to view information regarding their player tracking account in a similar manner or at the same time as they obtain their financial account information. As is known, it is common to award points to game players based upon their game play. These points may be redeemed for prizes, such as free game play, food, tickets to shows and other goods and services.

In one embodiment, a player may be provided with both their monetary account balance and their point total. In some instances, a player may be permitted to "buy" player reward points, or cash in player point. In the first arrangement, a player may desire to obtain a player reward but may be a few points short of the level of points necessary. The player may be permitted to transfer money from their financial account to the casino to buy the additional points necessary. In the second arrangement, the casino may offer a "cash-back" on points. A player may turn in their points at a predetermined rate for money which is deposited in their financial account.

In one or more embodiments, a player may be permitted to use deposited funds at the casino, and may not be permitted to withdraw funds. This account arrangement is particular suited to that where a casino offers cash-back on play or points, as the casino is then assured that the player will bet those monies again at a later date. This account configuration also is particularly suited to the casino offering a bonus. For example, a casino may deposit an amount equal to a predetermined amount of a player's deposit in addition to the player's deposit. For example, a casino may indicate that the size of a player's deposit is 105% of the player's actual deposit.

One or more embodiments of the invention may be used to facilitate remote play of a game or games by a player. In one embodiment, game information may be transmitted to a player at a remote location, thus enabling a player to play the game at the remote location. For example, referring to FIG. 5, the system 100 may include a game server 138 which generates game play information and receives or accepts game play input from a remote player. The game server is preferably in communication with the gateway 122 or other communication interface so that game play information may be transmitted to a player over a dedicated line or the Internet. A player's input may be transmitted from the player's location to the game server 138. The player's location may comprise a remote dedicated station, a desktop or laptop computer or the like.

Advantageously, a player's remote play in this fashion may be tracked by the player tracking network, with game play information transmitted from the game server 138 to the player tracking server 136. In addition, a player may use their financial account to both fund their betting activities and receive winnings.

In like manner to the play of a gaming machine 102, a remote player may input their account information, such as by swiping their card through a card reader associated with the remote station, such as the player's computer. The player may also manually input the account information. Also in like manner to play of a gaming machine 102, the identification information may be used to validate the player's right to play a game, to place bets, to track game play and the like. For example, the player identification information may be used by the financial transaction server 120 to verify that the player has funds for placing a wager or bet. Such verification may be received from the game server 138 in response to input of bet or wager information from a player.

In general, the various methods of the invention described may be applied to this remote gaming environment, with the player having winnings credited to their account and the other activities described herein.

A particular advantage of this arrangement as applied to remote gaming is security. When a player uses their player account to fund their wagering activity, the casino can be sure that the player is entitled to place bets, since the casino has direct access to and control over the player's account. In addition, the player is protected, since the player is using an account associated with the gaming entity. The player is not required to enter credit card or bank information which may be intercepted by others and then used for a variety of purposes.

Of course, the game server 138 or other apparatus may be configured to generate graphical user interface information which is transmitted to a remote player. The player may utilize this interface to interact with the system 100, such as be inputting identification information when required and engaging in other account and game play transactions.

In one embodiment of the invention, the various servers, such as the game server 138, financial sever 120 and player tracking server 136 are all part of the same network, such as a LAN of a casino. In another embodiment, it will be appreciated that the various servers or other apparatus may be associated with different networks. For example, several casinos may utilize a system such as described, but where only a single financial server and/or player tracking server are provided at one location. Gaming machines may be associated with a number of different networks at different properties, but placed in communication with the single financial and/or player tracking server.

In one embodiment, a casino may offer cards which are associated with "pre-paid" accounts in similar fashion to that described above for use generally in purchasing goods and services. For example, a casino may sell cards at grocery stores and other locations. The price of the card may be discounted in relation to the actual value of the account. For example, a player may pay $20 for a card which is associated with an account having $25 worth of credits therein. These cards may be used by any party, and may be transferable, making them useful as gifts.

One or more aspects of the invention comprise a method and apparatus or system for monitoring or tracking player gaming losses.

In accordance with the method previously described, information regarding a player's gaming activities is associated with a player account. This information may include, for example, amounts withdrawn from and deposited to the account. The deposit information may include specific information regarding the type of deposit, such as a game award, a player deposit of funds, or a transfer of funds from a financial institution. Likewise, the information regarding withdrawals may include information regarding the type or nature of the withdrawal. For example, the withdrawal may be for an amount bet at a gaming machine or may be a player's direct withdrawal of monies.

Using this financial data, information may be generated regarding a player's win or loss during a period of time. For example, player loss may be determined by subtracting amounts withdrawn for purposes of playing a game from amounts deposited (including amounts deposited by the player or as an award for game play). In one embodiment, means are provided for determining or generating player loss (or gain) information. This means may comprise software arranged to utilize the financial information to generate loss/gain information. The software may including filtering capabilities for determining loss or gain during a specific period of time, and including only certain types of transactions.

As indicated above, in a preferred embodiment, player tracking and financial transaction functions are implemented by a player identifying themselves with an access media. In other embodiments, however, a player may identify themselves by other means, such as by entry of a code via a keyboard or the like. As one aspect of a method of the invention, a player's financial transactions may be monitored or tracked, including for purposes of determining losses, even if the player does not use the access media or other identification which is provided by the casino.

As detailed above, in one embodiment, a player may obtain funds from an outside source, such as from a bank or other financial institution by use of an ATM card or credit card. This request is routed through the financial server 120. When a player places such a request, if an account is not already created for the player, one is created. In this arrangement, the player may be identified by unique information associated with the ATM, credit card or other outside banking account. For example, when a player uses their credit card or ATM to request monies, unique information is transmitted to the financial institution so that the financial institution may complete the transaction. The casino or other entity may use this information to identify the player and establish an account or file of information with that player.

The request for funds may in this manner be tracked or monitored independent of a casino issued media or the like. If the same player later makes another request for funds, this request may also be tracked. Such requests for funds may be used to indicate loss. Thus, in the event the one or more requests for funds exceeds a predetermined amount in a predetermined period of time, the casino may seek to contact the player and prevent their further play. In addition, the casino may prevent the player from seeking additional funds via the system. As an example, a jurisdiction may have a loss limit of $200 in a two hour period. A player may seek $200 in funds using their credit card at the beginning of gaming play. If the same player seeks additional funds within a two hour period, the casino may block the attempt to obtain funds.

This aspect of the invention is advantageous in that it allows a casino to monitor player activities, and in particular financial activities which may relate to losses, even though a player does not utilize the casino's player tracking system. Thus, the system allows a casino to monitor a player's activity even if the player plays one or more games which do not include monitoring capabilities, where the player is not a patron of the casino's player tracking system, or does not use their card or otherwise specifically identify themselves.

As another aspect of the invention, the system and method of the invention may be applied to an environment of multiple game providers, such as casinos in multiple locations. In one embodiment, the invention may be used among casinos in a single jurisdiction to monitor player play, including player losses. In this arrangement, multiple casinos in a single jurisdiction may cooperate to ensure the requirements, such as loss limits, for that jurisdiction are met. In another embodiment, the invention may be used among casinos or game providers in multiple jurisdictions, with information shared to ensure compliance with the regulations of all jurisdictions.

In this embodiment, a system similar to that illustrated in FIG. 2 may be provided at each casino or other gaming entity. When a player engages in a transaction, such as requesting funds, placing bets or the like, the financial server at that casino is preferably arranged to request financial information regarding the player from other casinos. This request may comprise a query transmitted over a communication link to the financial server of one or more other casinos. The query is preferably for information regarding the player which is pertinent to compliance with the jurisdictional requirements relating to loss limits or the like.

As one example, when a player begins play of a game at a particular casino, such as indicated by their identification with a player media, then the financial server of that casino may send a query to other casinos. This query may be for loss information for that player during a previous period of time. If the player has already exceeded the maximum loss during the period of time at the first or other casino, then the present casino may block the player's play.

In one embodiment, the system may be implemented via a clearinghouse or more centralized system which one or more casinos or other gaming entities utilize. In this arrangement, all player transactions may pass through the clearinghouse, such that tracking and monitoring is centralized.

As one example of such an embodiment, a particular jurisdiction may have regulations regarding the financial transactions of a player, such as maximum loss by a player at any gaming entity in the jurisdiction. In order to ensure that this regulation is satisfied, each gaming entity may utilize a system such as described herein for monitoring or tracking the player's financial activities. In one embodiment, an entity of the jurisdiction, such as a gaming control board or an entity under the direction of such an authority, may track player data from all gaming entities via a centralized system. This system may include a central financial host or server with communication links to each gaming entity. The central financial host may be arranged to store consolidated player account information. When a player engages in a financial transaction at a particular gaming entity, that transaction may be monitored at the financial server for that particular gaming entity. In addition, the player's financial transaction information is forwarded to the central financial host, where it is aggregated with transaction information regarding that player provided by other entities.

In such an embodiment, before a particular gaming entity allows a player to engage in a transaction, the financial server may be arranged to poll the central financial host to determine if the player is eligible to engage in the transaction. In another embodiment, if a player violates particular regulations or rules as determined at the central financial host from the player's aggregated information, then the central financial host may send information to the gaming entities indicating the status of the player, such as that the player is not permitted to place additional bets for a predetermined period of time.

In an embodiment where a player's actions are tracked at a variety of different gaming entities, a means must generally exist for identifying a player across or between those different casinos or other game providers. In one embodiment, this may require that the player utilize the same identification at the different gaming entities. For example, in one embodiment a jurisdictional gaming control board may require that all players identify themselves with a unique identifier which is associated with the central financial host and each particular gaming entity. In another embodiment, a player's account may include "alias" player identification information by which the player may be identified. This information may comprise, for example, the player tracking identification assigned to the player by the different gaming entities and bank or other identification information. In one embodiment, in order to protect unique player identification information belonging to a particular gaming entity from becoming known to another gaming entity, the "alias" information may only be kept and used at the central financial host.

A particular advantage of the invention is realized over known player tracking systems. In known player tracking systems, a player identifies themselves with a player tracking card. The gaming machine sends coin in and coin out data for creating individual game play records. A problem with this arrangement is that a player may play different gaming machines at different times, and it is difficult to monitor a player's cumulative activities. In accordance with the invention, all financial transaction information is monitored through a financial transaction host or via similar means, and the player's financial transactions are tracked independent of information provided from each gaming machine. In the arrangement of the invention, the financial information is tracked centrally from an account or accounts belonging to the player. This information tracking or generation can be independent of coin in/coin out data generated by a gaming machine.

In one embodiment, the transactions of more than one player may be linked. For example, in one embodiment, the transactions of members of a family may be associated with a single account. This allows, for example, a family to monitor their transactions in totality.

In another embodiment, the transactions of multiple players may be linked even though separate accounts are associated with the players. In this arrangement, the financial information or data associated with the various players in the various accounts may be aggregated for determining transactions, such as group loss, in totality.

In one or more embodiments of the invention, the method of the invention may include the step of a casino or other entity preventing a player (or in the event of linked players, such as a family, multiple players) from playing games or deducting monies from their account for at least a period of time in the event it is determine the player has incurred at least a predetermined loss in a predetermined period of time. For example, if a player loses more than a predetermined amount of money playing games, then the player may be prevented from further play until a period of time expires. This aspect of the invention may be implemented as computer code at the financial server. In the event the loss criteria are met, the software may prevent deductions of monies from the account. The deductions may be limited to requests for credit at gaming machines, or may also include player attempts to withdraw monies, such as at a cashier cage.

One or more aspects of the invention may be implemented at one or more outside financial institutions instead of directly at a casino other gaming establishment. In such an arrangement, the financial transaction information may be transmitted from the casino to the financial institution for association with a file/account at the financial institution.

While specific reference is made to player losses herein, will be appreciated that the invention may be used to determine a player's winnings or financial gain as a result of game play. As described below, in one or more embodiments, a determination of win may be used for a variety of criteria, including ceasing of further play to ensure the player does not bet won amounts.

A number of other configurations of methods and apparatus are contemplated. One or more additional aspects of player tracking and financial accounting/monitoring may be implemented using the apparatus and systems described herein.

In accordance with the invention, a player has control over their financial account. In one embodiment, so does the casino. The casino may access the player's account for a variety of purposes, such as limiting the total amount a player may withdraw from their account. For example, a casino may monitor player accounts and apply criteria to determine if a player is losing large sums or is engaging in uncommon account activity. If the player is suffering large losses, a casino may freeze the player's account or limit the total amount the player may withdraw. This aspect of the invention may be used to protect the player. The casino may also become aware of unusual account activity and freeze the account or conduct and investigation. Such an investigation may result in a finding that the player's card has been stolen and is being used by another party. In one embodiment, a player may indicate to the casino a maximum amount which the player is willing to lose in a predetermined period of time, allowing the casino to stop further play if the player meets that threshold. A player may also indicate to a casino that if a player wins a predetermined amount, the player wishes to have the casino prevent the player's further play.

In one embodiment, a casino may deduct taxes due from a winning directly from the player's account. Upon a win, the casino may determine the tax liability and transfer the withholding to a withholding account or directly transfer it to an IRS deposit account.

A casino may offer accounts with a variety of casino determined criteria. For example, a casino may offer accounts which have an expiration date. In the case of prepaid cards, the accounts associated with the cards may become unusable after a predetermine date or a predetermined time after purchase. In this manner, the length of time that the casino is exposed to play of the moneys is not unlimited. Amounts which are deposited into a player's account may also expire. For example, if a player redeems points for financial awards, the financial awards may have an associated expiration date by which the funds must be bet or bet lost.

A casino may enable usage of a financial account via on-line game play and table or other games besides electronic and electro-mechanical gaming machines. For example, a blackjack table may be fitted with card readers and keypads, and all chips bet and won may be accounted for via the system 100, such as by reading a bar code provided on the chips. A player may use their card to obtain $100 in chips at a table, and winnings may be credited by the dealer to the player's account.

Access media may be provided other than magnetic stripe card. In addition, a casino may not require that a PIN or other identifier be inputted in order to access the account.

A casino may permit a player to access their account information in a wide variety of manners. As illustrated in FIG. 2, a casino may provide kiosks 132 at which a player may access their account and obtain account information or manage their account. A player may also obtain account information and manage their account at a cashier station 126 or other customer service location.

In one embodiment, a player may utilized their casino card at an automated teller machine (ATM) in similar manner to a bank card. The player may withdraw funds from the account in the form of cash dispensed at the ATM.

A casino may enable a player to access their account from a room. An interface, such as integrated with a television, may be provided which permits a player to view account information and manage their account.

The methods and apparatus of the invention may be utilized for a variety of other purposes. In one embodiment, a casino may create one or more accounts for a player with which information may be associated establishing entitlement of the player to free game play. For example, a casino may create a "free play" player account for a player. The account may be created for a variety of reasons, such as a player's play as detected or tracked by the player tracking system or a player engaging in a particular promotion.

The casino may associate credits, points, or other information representing monetary value or no monetary value with the player account. The number of credits, points or the like which are assigned to a player may vary depending on a variety of circumstances. For example, a player may win points or credits when engaging in a promotional activity, or win or accrue points for game play at a gaming machine.

In one embodiment, a player may access and use the points, credits or the like in the account for game play offered by the issuer of the points/credits only. For example, a casino may reward the player with credits which the player may use at that same casino for free game play. The game play may be at a table game, electronic gaming machine or otherwise. In one embodiment, the points, credits or the like may entitle the player to free game play only at certain games or gaming machines.

In accordance with the invention, the player may be entitled to view their account and determine the number of points or credits which have been awarded and which can be played. The player may use their access media or the like to access the information. As described above, in one embodiment, the information may be obtained via a kiosk or even through a home computer. At a table game or gaming machine, the player may identify themselves, such as by use of their access media, and then gain access to those points or credits for use.

In one embodiment, the points or credits may expire. In another embodiment, they may be redeemed or transformed. For example, a player may be permitted to redeem the points, credits or the like for a cash value, reduced cash value, a prize or the like.

In one embodiment, the points or credits may be used at other casinos. In addition, the points or credits may be used for other free or reduced cost goods/services, such as food and drink, show tickets and the like.

In one embodiment, the points or credits may be awarded by other than a casino based upon other than game play by a player. For example, a player who dines at a restaurant at a casino may be awarded points or credits. The casino may enter into a venture with other goods or service providers. For example, a player may purchase goods from a sponsor and then be awarded points from the casino.

In one embodiment, a casino may establish one or more accounts which are not associated with a particular player or an identified player. Such accounts may be especially useful for promotions. In this embodiment, a casino may establish an account and associate credits or the like, as described above, with the account. The casino may issue an account media, such as a card or ticket. This media is associated with the account. The casino may also simply issue account identifying information, such as a code.

The media, code or the like may be issued to a party, such as a potential player. The recipient may then use the code or media to establish entitlement to use the credits or the like associated with the account for free or reduced cost game play, or other goods and/or services. For example, to entice a player to a casino, the casino may issue cards to patrons at a restaurant associated with the casino, or send them by mail, or otherwise distribute them. The casino may also distribute the media or information to travel agents or other entities who may distribute them to other recipients. The recipient of the card or other media may travel to the casino and use the card, such as by inputting it into a card reader. The card reader reads account identifying information from the card, and in response, information regarding the associated credits or the like may be forwarded to the gaming machine for use by the player in playing the gaming machine.

As described above, these accounts may be assigned an expiration date. This may be useful to quickly entice the recipient of the card or media to travel to the casino. In one embodiment, this type of account may be used to entice the recipient to the casino, where the recipient is further enticed into enrolling in the player reward system so that the casino may establish the identity of the player, including their address, name or the like so that other materials may be directed to the player.

In one embodiment, although the actual identity of the recipient/user of the account may be unknown to the casino, the recipient may further use the account for other purposes. For example, the recipient may not only use a card for free game play, but may associate additional credits with the account, view and manipulate the account in the respects detailed herein. In this embodiment, though the identity of the player is not known, the player possess information (i.e. the card or other media with associated account information) which entitles the player to utilize the account.

In another embodiment of the invention, a casino may create other types of prize or reward accounts for a player. For example, in one embodiment, a player may be awarded points, "miles" or other elements which represent prizes, such as discounts or goods or services, or are redeemable for discounts or goods or services. In one embodiment, a player may be awarded points which are redeemable only for awards, such as prizes. A player may be awarded "miles" which may be redeemed for free or reduced travel. A player may be awarded phone "minutes." Thus, in one embodiment, information may be associated with the player's account which represents a numerical value of elements (such as points or miles) which comprise an award or may be redeemed for an award from a third-party, such as an airline or telephone company.

Thus, in one or more embodiments, the award may be provided by the casino or through a secondary provider. For example, a casino may award "air miles" which the player may redeem for a free airline ticket, reduced price airline ticket or the like. In this embodiment, the casino may enter into an arrangement with one or more airlines to facilitate this arrangement, such as by reimbursing the airline for the cost of the award redeemed by the player, buying bulk awards or the like. In similar fashion, a casino may award free long distance call minutes which the player can use by placing a call via one or more long distance carriers. The casino may again enter into an arrangement with one or more providers for this purpose.

In one embodiment, the casino may generate an account and associate particular awards with that account. For example, based upon certain criteria, a player may be awarded football tickets, new tires, or a variety of other goods/services. In this embodiment, the casino may associate information regarding the award with the account. The player may then access the account to redeem the award. For example, the player may identify themselves at the casino and obtain a voucher, ticket or the like, or simply obtain the goods/services.

In one embodiment, the awards may comprise actual identified goods or services. In another embodiment, a player may be awarded points or the like which may be redeemed for goods or services, or particular goods and services from a list of identified goods and services. For example, a player may attempt to accrue points which may be used to obtain goods and services associated with a particular source or category of goods/services.

The casino may award an award (whether points, credits or actual prizes) or the player may establish entitlement to an award (whether represented by points, miles or otherwise) based upon a variety of criteria. As indicated above, entitlement may be based upon participation in a promotion or activities other than game play. For example, a casino may award points or other rewards for a player attending an event, dining at a particular restaurant or the like. In addition, a casino may have a promotion to entice players to play a specific new game.

The award may be provided based upon game play. For example, an award (or prizes or points, etc.) may be provided if the player plays any game or a particular game at the casino during a particular time period (such as one day, week, month or the like) or plays a game or games a sufficient number of times (by total games played, total bet, etc.), the player may be deemed to have qualified for an award.

The casino may randomly grant awards, or grant them based on other criteria such as demographics (where the player lives, age, etc.). For example, a casino may track game play and award a player for their play, either based upon specific predetermined criteria such as total bets or time played, or based on discretion.

As described, the points, credits or accounts may have start and end dates during which they are active and may be used. Before the start date, a player may not be permitted to accrue awards or points. After the end date, a player may be prohibited from using accrued points or redeeming awards.

As described above, in one embodiment, a player may purchase points, miles, minutes or the like for accrual with other awards. For example, a player may wish to attain a certain number of miles in order to redeem them for an award, such as a free airline ticket. The player may be permitted to purchase the additional miles for accrual with other miles already awarded in order to achieve the desired level.

In one embodiment, prizes or points may also be associated with "anonymous" accounts where the identity of the player is not know. For example, casinos may distribute cards or other media associated with accounts with which points or prizes of various sizes (or none at all) are associated. In one embodiment, in order for the recipient of the card to utilize the card and determine if points or prizes are associated therewith, the player may be required to identify themselves (such as at a redemption station), or the player may be required to play one or more games. In this manner, the recipient of a card or other media may be enticed to travel to the casino, to provide information regarding themselves, or to play games.

The present invention in more general application has numerous benefits and advantages. In one embodiment, an account of the present invention is configured to permit minors to make financial transactions. In accordance with the invention, a debit account is established by or for the minor. Because of the existence of the funds in the account, a minor may complete a transaction without concern to the account provider/financial institution that the minor will pay for goods.

In one or more embodiments, this arrangement permits a customer to "buy" an account for use by another person in a fixed amount. In this manner, the account may be used as a gift. This arrangement has the advantage that the recipient of the account can utilize the funds associated with the account to make a purchase or pay for goods/services from essentially any location. The recipient may purchase goods on-line or at a store. The recipient is not limited to a particular store or mall.

The customer may also utilize one or more of the accounts in similar fashion to travelers checks. Because the funds associated with the accounts are different, a loss such as by theft of a single access media does not affect the remaining funds. For added security, each access media may have a different access code.

Parents and others may arrange an account for their children. The children are not permitted to spend more money than their parents provide, because of the arrangement of the account. On the other hand, the parents can provide their children with a convenient means for paying for items even though they may be located a great distance apart. The parents may also access the account to track purchases and other transactions by their children. The parents may also arrange the account as an "allowance" account, where funds are placed into their children's account at predetermined intervals without specific action by the parents or children at the time of each deposit.

The methods and accounts of the present invention has several safety features. In one embodiment, an account may expire after a predetermined time. In this arrangement, the risk that a thief may find and be able to use a lost access card is reduced. The account is associated with a unique account signature which is generated from data which is difficult to obtain.

The methods and accounts permit a wide range of transactions, including a number of very specific transactions which are not presently facilitated. For example, a vendor may establish promotional accounts for current and potential customers. One advantage of a promotional account is that a large company may establish accounts which customers can use at one or more of their stores located in different areas. For example, a retailer having outlet in Los Angeles and New York may issue cards associated with accounts for use by customer at either location. This arrangement is also advantageous for franchisees: the franchiser may sponsor a promotion for their franchisees whereby the discount or amounts provided to the customers are paid for by the franchiser.

A promotional account may also be a prize or award. A vendor may award an account to one or more customer who win a contest or drawing or the like. A vendor may also arrange the promotional account with an expiration date requiring the customer to utilize the account within a predetermined time.

A customer may establish a charity account for themselves, or a charity may establish an account for a customer. For example, a charity may seek donations from customers in the form of deposits into a charity account established by the charity for the customer.

In one or more embodiments, a customer or other user of a promotional account may be prevented from any account activities except use of the account to facilitate a purchase. The customer or user to whom the account is issued may be prevented from obtaining funds from the account (such as cash) or viewing data associated with the account such as the remaining balance or the like. A customer may also be prevented from merging the account or adding funds to the account. On the other hand, a vendor may be permitted to track all purchases and other uses of promotional accounts. In this manner, the vendor can obtain important data regarding the customer, including their spending habits, spending locations and similar information.

A business may use the account for business to business transactions. For example, a business may set up a master account and a number of sub or allowance accounts. The business may use the accounts to pay suppliers of goods and services. The master account may comprise a main account for the business and each allowance account an account relating to a particular vendor or project. Commensurate with billing or an accounting period, the business may have arranged an automatic transfer of funds from the master account to one or more of the allowance accounts, and from one or more of the allowance accounts to each particular supplier for their bill.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A casino gaming system comprising:
   a plurality of gaming machines, each said gaming machine comprising a player identification input device, one or more input mechanisms for receiving cash or an indicia of credit for a wager to play a wager based game, and one or more output mechanisms for outputting cash or an indicia of credit;
   a financial transaction host, said financial transaction host in communication with each of said plurality of gaming machines via a communication network, said financial transaction host including memory for storing data files corresponding to at least one personal account of at least one player and identifiable with player identification data from said player identification input device, said data files including information regarding finances available for use by said player in playing one or more of said plurality gaming machines;
   a player reward host, said player reward host being remote from, and in communication with, each of said plurality of gaming machines and said financial transaction host, said player reward host including a memory for storing data files corresponding to said at least one player and identifiable with said player identification data, said data files including player reward information; the player reward host configured to make a determination whether the player satisfies a criteria for receiving an award of a game play credit, and to generate the game play credit when the player satisfies the criteria and
   at least one communications gateway through which the player, via at least one of the plurality of gaming machines, has access to:
      generate a general account associated with said player;
      provide funding to the general account;
      generate at least one of a charity account and an allowance account associated with said player;
      receive and utilize the game play credit to play one or more games without additional monetary input,
      utilize at least one of the general account and the allowance account as a source of a transaction of any nature including allocation to the charity account associated with said player but restricting player or game generated debits against the charity account.

2. The casino gaming system in accordance with claim 1 wherein said criteria comprises said player participating in a promotion.

3. The casino gaming system in accordance with claim 1 wherein said criteria comprises the play of one or more games by said player.

4. The casino gaming system in accordance with claim 3 wherein said one or more games comprises at least one table game or electronic game.

5. The casino gaming system in accordance with claim 1 wherein said game play credit has no monetary value.

6. The casino gaming system in accordance with claim 1 wherein the system is configured to permit said player to access at least one of the general account and the allowance account, but not the charity account to determine a number of available game play credits.

7. The casino gaming system of claim 1, wherein the system is configured to electronically transfer funds from the charity account to an intermediate escrow account as part of the distribution to the charity.

* * * * *